(12) United States Patent
Stuckman et al.

(10) Patent No.: US 11,281,205 B2
(45) Date of Patent: Mar. 22, 2022

(54) RADIO CONTROLLED AIRCRAFT, REMOTE CONTROLLER AND METHODS FOR USE THEREWITH

(71) Applicant: Drone-Control, LLC, Wilmington, DE (US)

(72) Inventors: Katherine C. Stuckman, Austin, TX (US); Michael D. Reynolds, Cedar Park, TX (US)

(73) Assignee: DRONE-CONTROL, LLC, Wilmington, DE (US)

(*) Notice: Subject to any disclaimer, the term of this patent is extended or adjusted under 35 U.S.C. 154(b) by 627 days.

(21) Appl. No.: 16/229,994

(22) Filed: Dec. 21, 2018

(65) Prior Publication Data

US 2019/0121354 A1 Apr. 25, 2019

Related U.S. Application Data

(60) Continuation of application No. 15/392,687, filed on Dec. 28, 2016, now Pat. No. 10,248,117, which is a
(Continued)

(51) Int. Cl.
*G05D 1/00* (2006.01)
*A63H 27/00* (2006.01)
(Continued)

(52) U.S. Cl.
CPC ......... *G05D 1/0022* (2013.01); *A63H 27/004* (2013.01); *A63H 27/02* (2013.01);
(Continued)

(58) Field of Classification Search
CPC .. G05D 1/0022; G05D 1/0033; G05D 1/0202; G05D 1/0808; A63H 27/004;
(Continued)

(56) References Cited

U.S. PATENT DOCUMENTS 3,053,480 A 9/1962 Vanderlip
3,094,299 A 6/1963 Bond et al.
(Continued)

FOREIGN PATENT DOCUMENTS

AU 558442 B2 1/1987
AU 636484 B2 4/1993
(Continued)

OTHER PUBLICATIONS

Patent Owner's Motion to Amend Appendix—Claim Listing Pursuant to 37 C.F.R. § 42.121, *SZ DJI Technology Co., Ltd. and Parrot Inc. v. Synergy Drone LLC*, Case No. IPR2018-00208, U.S. Pat. No. 9,568,913, 16 pages.
(Continued)

*Primary Examiner* — Peter D Nolan
*Assistant Examiner* — Luke Huynh
(74) *Attorney, Agent, or Firm* — Garlick & Markison; Bruce E. Stuckman

(57) ABSTRACT

A radio controlled (RC) vehicle includes a receiver configured to receive a radio frequency (RF) signal from a remote control device. The RF signal indicates command data in accordance with a first coordinate system. The command data includes yaw-velocity command data. The RC vehicle includes motion sensors configured to generate motion data. The RC vehicle includes a processor coupled to the motion sensors and to the receiver. The processor is configured to transform the command data into control data based on the motion data and in accordance with a second coordinate system from a perspective of the RC vehicle. The control data includes yaw-velocity control data. The yaw-velocity control data is related to the yaw-velocity command data. The RC vehicle includes control devices coupled to the processor and configured to control motion of the RC vehicle based on the control data.

16 Claims, 8 Drawing Sheets

Related U.S. Application Data continuation of application No. 14/724,037, filed on May 28, 2015, now Pat. No. 9,568,913, which is a continuation of application No. 14/102,995, filed on Dec. 11, 2013, now Pat. No. 9,079,116, which is a continuation of application No. 13/688,886, filed on Nov. 29, 2012, now Pat. No. 8,649,918, which is a continuation of application No. 13/471,642, filed on May 15, 2012, now Pat. No. 8,380,368, which is a division of application No. 12/029,470, filed on Feb. 12, 2008, now Pat. No. 8,200,375.

(51) Int. Cl.
| | |
|---|---|
| *A63H 30/04* | (2006.01) |
| *A63H 31/10* | (2006.01) |
| *B64C 19/00* | (2006.01) |
| *B64C 27/57* | (2006.01) |
| *B64C 39/02* | (2006.01) |
| *G05D 1/02* | (2020.01) |
| *G05D 1/08* | (2006.01) |

(52) U.S. Cl.
CPC ............ *A63H 27/12* (2013.01); *A63H 30/04* (2013.01); *A63H 31/10* (2013.01); *B64C 19/00* (2013.01); *B64C 27/57* (2013.01); *B64C 39/024* (2013.01); *G05D 1/0033* (2013.01); *G05D 1/0202* (2013.01); *G05D 1/0808* (2013.01); *B64C 2201/024* (2013.01); *B64C 2201/146* (2013.01)

(58) Field of Classification Search
CPC ........ A63H 27/02; A63H 27/12; A63H 30/04; A63H 31/10; B64C 19/00; B64C 27/57; B64C 39/024; B64C 2201/024; B64C 2201/146
USPC .......................................................... 701/2
See application file for complete search history.

(56) References Cited

U.S. PATENT DOCUMENTS

| | | | |
|---|---|---|---|
| 3,534,399 | A | 10/1970 | Hirsch |
| 4,375,631 | A | 3/1983 | Goldberg |
| 4,466,774 | A | 8/1984 | Cycon et al. |
| 4,490,710 | A | 12/1984 | Kopsho, Jr. et al. |
| 4,770,607 | A | 9/1988 | Cycon et al. |
| 4,964,598 | A | 10/1990 | Berejik et al. |
| 5,001,646 | A | 3/1991 | Caldwell et al. |
| 5,043,646 | A | 8/1991 | Smith, III et al. |
| 5,048,652 | A | 9/1991 | Cycon et al. |
| 5,058,824 | A | 10/1991 | Cycon et al. |
| 5,152,478 | A | 10/1992 | Cycon et al. |
| 5,226,350 | A | 7/1993 | Cycon et al. |
| 5,277,380 | A | 1/1994 | Cycon et al. |
| 5,281,099 | A | 1/1994 | Hunter et al. |
| 5,301,568 | A | 4/1994 | Kono |
| 5,340,279 | A | 8/1994 | Cycon et al. |
| 5,351,913 | A | 10/1994 | Cycon et al. |
| 5,364,230 | A | 11/1994 | Krauss et al. |
| 5,429,089 | A | 7/1995 | Thornberg et al. |
| 5,552,983 | A * | 9/1996 | Thornberg ............ G05D 1/0033 180/167 |
| 5,575,438 | A | 11/1996 | McGonigle et al. |
| 5,676,334 | A | 10/1997 | Cotton et al. |
| 5,859,372 | A | 1/1999 | Neltoft |
| 5,890,441 | A | 4/1999 | Swinson et al. |
| 5,984,240 | A | 11/1999 | Shinagawa |
| D418,805 | S | 1/2000 | Cycon et al. |
| 6,076,024 | A | 6/2000 | Thornberg et al. |
| 6,092,007 | A | 7/2000 | Cotton et al. |
| 6,170,778 | B1 | 1/2001 | Cycon et al. |
| 6,270,038 | B1 | 8/2001 | Cycon et al. |
| 6,460,810 | B2 | 10/2002 | James |
| 6,478,262 | B1 | 11/2002 | Kinkead et al. |
| 6,527,225 | B1 | 3/2003 | Slider, Jr. et al. |
| 6,584,382 | B2 | 6/2003 | Karem |
| 6,629,023 | B1 | 9/2003 | Slider, Jr. et al. |
| 6,694,228 | B2 | 2/2004 | Rios |
| 6,697,715 | B1 | 2/2004 | Freeman |
| 6,856,894 | B1 | 2/2005 | Bodin et al. |
| 6,885,917 | B2 | 4/2005 | Osder et al. |
| 7,101,246 | B1 | 9/2006 | Dammar |
| 7,130,741 | B2 | 10/2006 | Bodin et al. |
| 7,286,913 | B2 | 10/2007 | Bodin et al. |
| 7,497,759 | B1 | 3/2009 | Davis |
| 7,526,362 | B2 | 4/2009 | Kim et al. |
| 7,873,444 | B1 | 1/2011 | Ehrmantraut et al. |
| 8,014,909 | B2 | 9/2011 | Builta et al. |
| 8,200,375 | B2 * | 6/2012 | Stuckman ............ A63H 27/12 701/2 |
| 8,380,368 | B2 | 2/2013 | Stuckman et al. |
| 8,649,918 | B2 | 2/2014 | Stuckman et al. |
| 9,079,116 | B2 | 7/2015 | Stuckman et al. |
| 9,568,913 | B2 | 2/2017 | Stuckman et al. |
| 9,589,476 | B2 | 3/2017 | Zhang et al. |
| 9,904,292 | B2 * | 2/2018 | Pedersen ................ B64C 15/02 |
| 10,095,226 | B1 | 10/2018 | Stuckman et al. |
| 2002/0104921 | A1 | 8/2002 | Louvel |
| 2002/0163905 | A1 | 11/2002 | Brabrand |
| 2004/0068333 | A1 | 4/2004 | Cantello et al. |
| 2005/0094851 | A1 | 5/2005 | Bodin et al. |
| 2005/0127242 | A1 | 6/2005 | Rivers, Jr. |
| 2006/0144994 | A1 * | 7/2006 | Spirov ................ G05D 1/0816 244/62 |
| 2006/0155508 | A1 | 7/2006 | Choi |
| 2006/0178085 | A1 | 8/2006 | Sotereanos et al. |
| 2007/0105474 | A1 | 5/2007 | Gotou et al. |
| 2007/0168157 | A1 | 7/2007 | Khibnik et al. |
| 2007/0221780 | A1 | 9/2007 | Builta |
| 2007/0260726 | A1 | 11/2007 | Rozak et al. |
| 2009/0004004 | A1 | 1/2009 | Mncenzi |
| 2009/0050747 | A1 | 2/2009 | Troutman |
| 2009/0204276 | A1 | 8/2009 | Stuckman et al. |
| 2010/0012776 | A1 | 1/2010 | Hursig et al. |
| 2010/0161155 | A1 | 6/2010 | Simeray |
| 2010/0292868 | A1 | 11/2010 | Rotem et al. |
| 2016/0091894 | A1 | 3/2016 | Zhang et al. |
| 2016/0093124 | A1 | 3/2016 | Shi et al. |

FOREIGN PATENT DOCUMENTS

| | | |
|---|---|---|
| AU | 664144 B2 | 11/1995 |
| AU | 664522 B2 | 11/1995 |
| AU | 664678 B2 | 11/1995 |
| AU | 665319 B2 | 12/1995 |
| AU | 667650 B2 | 3/1996 |
| AU | 683551 B2 | 11/1997 |
| AU | 693202 B2 | 6/1998 |
| AU | 697735 B2 | 10/1998 |
| AU | 708402 B2 | 8/1999 |
| AU | 755241 B2 | 12/2002 |
| AU | 772173 B2 | 4/2004 |
| CA | 2030612 A1 | 5/1991 |
| CA | 2138656 A1 | 1/1994 |
| CA | 2182374 A1 | 9/1995 |
| CA | 2186593 A1 | 10/1995 |
| CA | 2189854 A1 | 11/1995 |
| CA | 2241114 A1 | 7/1997 |
| CA | 2330046 A1 | 11/1999 |
| CA | 2535053 A1 | 2/2005 |
| CA | 2788512 A1 | 11/2005 |
| CN | 1843710 A | 10/2006 |
| CN | 1843847 A | 10/2006 |
| CN | 101027214 A | 8/2007 |
| CN | 200976108 Y | 11/2007 |
| DE | 3330721 A1 | 3/1984 |
| DE | 69107677 T2 | 6/1995 |
| DE | 69501209 T2 | 4/1998 |
| DE | 69501890 T2 | 10/1998 |
| DE | 69318713 T2 | 1/1999 |
| DE | 69505244 T2 | 2/1999 |

(56) References Cited

FOREIGN PATENT DOCUMENTS

| | | |
|---|---|---|
| DE | 69900687 T2 | 9/2002 |
| DE | 69332506 T2 | 7/2003 |
| DE | 69332507 T2 | 7/2003 |
| DE | 69332527 T2 | 8/2003 |
| DE | 60004038 T2 | 4/2004 |
| EP | 0430855 A1 | 6/1991 |
| EP | 0522829 A2 | 1/1993 |
| EP | 0457710 B1 | 3/1995 |
| EP | 0752634 A1 | 1/1997 |
| EP | 0748470 B1 | 12/1997 |
| EP | 0758972 B1 | 3/1998 |
| EP | 0646084 B1 | 5/1998 |
| EP | 0861777 A1 | 9/1998 |
| EP | 0861778 A1 | 9/1998 |
| EP | 0755481 B1 | 10/1998 |
| EP | 1080398 B1 | 1/2002 |
| EP | 0861775 B1 | 11/2002 |
| EP | 0861776 B1 | 11/2002 |
| EP | 0861779 B1 | 11/2002 |
| EP | 1175336 B1 | 7/2003 |
| EP | 1660958 B1 | 4/2012 |
| GB | 2125752 B | 12/1985 |
| IL | 98102 A | 4/1993 |
| IL | 106090 A | 3/1998 |
| IL | 125019 A | 4/2001 |
| IL | 139206 A | 7/2004 |
| IT | 1169792 B | 6/1987 |
| JP | 5963297 A | 4/1984 |
| JP | 60234683 A | 11/1985 |
| JP | 3223527 A | 10/1991 |
| JP | 446897 A | 2/1992 |
| JP | 519854 A | 1/1993 |
| JP | 5285276 A | 11/1993 |
| JP | 7178235 A | 7/1995 |
| JP | 7246999 A | 9/1995 |
| JP | 7257489 A | 10/1995 |
| JP | 7300096 A | 11/1995 |
| JP | H08-10451 A | 1/1996 |
| JP | 8239096 A | 9/1996 |
| JP | 8239097 A | 9/1996 |
| JP | 9510032 A | 10/1997 |
| JP | 9511806 A | 11/1997 |
| JP | 9512765 A | 12/1997 |
| JP | 1193812 A | 4/1999 |
| JP | 2911643 B2 | 6/1999 |
| JP | 2000502632 A | 3/2000 |
| JP | 2000118498 A | 4/2000 |
| JP | 2001026296 A | 1/2001 |
| JP | 2001026298 A | 1/2001 |
| JP | 2001026299 A | 1/2001 |
| JP | 2001-209427 A | 8/2001 |
| JP | 2001246177 A | 9/2001 |
| JP | 2001301695 A | 10/2001 |
| JP | 2001306143 A | 11/2001 |
| JP | 2001306144 A | 11/2001 |
| JP | 3297830 B2 | 7/2002 |
| JP | 2002215232 A | 7/2002 |
| JP | 3343118 B2 | 11/2002 |
| JP | 3343237 B2 | 11/2002 |
| JP | 3343238 B2 | 11/2002 |
| JP | 2002542115 A | 12/2002 |
| JP | 2002542116 A | 12/2002 |
| JP | 2003190658 A | 7/2003 |
| JP | 2003202922 A | 7/2003 |
| JP | 2003308120 A | 10/2003 |
| JP | 2004268715 A | 9/2004 |
| JP | 2004268722 A | 9/2004 |
| JP | 2004268730 A | 9/2004 |
| JP | 2004268736 A | 9/2004 |
| JP | 2004268737 A | 9/2004 |
| JP | 2004271339 A | 9/2004 |
| JP | 2004291805 A | 10/2004 |
| JP | 200528935 A | 2/2005 |
| JP | 2006513890 A | 4/2006 |
| JP | 2006264573 A | 10/2006 |
| JP | 2006312344 A | 11/2006 |
| JP | 2007501931 A | 2/2007 |
| JP | 2007130146 A | 5/2007 |
| JP | 2007203008 A | 8/2007 |
| JP | 4141860 B2 | 8/2008 |
| JP | 4289794 B2 | 7/2009 |
| JP | 4532820 B2 | 8/2010 |
| RU | 2062246 C1 | 6/1996 |
| RU | 2108267 C1 | 4/1998 |
| RU | 2108269 C1 | 4/1998 |
| RU | 2113378 C1 | 6/1998 |
| RU | 2114766 C1 | 7/1998 |
| RU | 2117604 C1 | 8/1998 |
| RU | 2125952 C1 | 2/1999 |
| RU | 2133210 C1 | 7/1999 |
| RU | 2142567 C1 | 12/1999 |
| RU | 2145725 C1 | 2/2000 |
| WO | 9400347 A2 | 1/1994 |
| WO | 9524004 A1 | 9/1995 |
| WO | 9527847 A1 | 10/1995 |
| WO | 9530575 A1 | 11/1995 |
| WO | 9724260 A2 | 7/1997 |
| WO | 9955582 A2 | 11/1999 |
| WO | 9956188 A1 | 11/1999 |
| WO | 0064735 A1 | 11/2000 |
| WO | 0064736 A1 | 11/2000 |
| WO | 0195043 A1 | 12/2001 |
| WO | 03093915 A1 | 11/2003 |
| WO | 2005015332 A2 | 2/2005 |
| WO | 2005103939 A1 | 11/2005 |
| WO | 2007130587 A2 | 11/2007 |
| WO | 2007130587 A3 | 11/2007 |
| WO | 2007141795 A1 | 12/2007 |

OTHER PUBLICATIONS

Annotated Figure 4 of JP Patent Publication 2001-209427, 1 page.
Annotated Figure 5 of JP Patent Publication 2001-209427, 1 page.
Annotated Figure 5 of U.S. Pat. No. 8,200,375 issued Jun. 12, 2012, 1 page.
Declaration of Masafumi Miwa, Ph.D., Translation included, dated Nov. 17, 2017, 10 pages.
Second Declaration of R. John Hansman, Jr., Ph D., *SZ DJI Technology Co., Ltd. and Parrot Inc. v. Synergy Drone LLC*, Case No. IPR2018-00204, U.S. Pat. No. 8,200,375, dated Dec. 31, 2018, 100 pages.
Second Declaration of R. John Hansman, Jr., Ph D., *SZ DJI Technology Co., Ltd. and Parrot Inc. v. Synergy Drone LLC*, Case No. IPR2018-00205, U.S. Pat. No. 8,380,368, dated Dec. 31, 2018, 100 pages.
Second Declaration of R. John Hansman, Jr., Ph D., *SZ DJI Technology Co., Ltd. and Parrot Inc. v. Synergy Drone LLC*, Case No. IPR2018-00206, U.S. Pat. No. 8,649,918, dated Dec. 31, 2018, 100 pages.
Second Declaration of R. John Hansman, Jr., Ph D., *SZ DJI Technology Co., Ltd. and Parrot Inc. v. Synergy Drone LLC*, Case No. IPR2018-00207, U.S. Pat. No. 9,079,116, dated Dec. 31, 2018, 100 pages.
Second Declaration of R. John Hansman, Jr., Ph D., *SZ DJI Technology Co., Ltd. and Parrot Inc. v. Synergy Drone LLC*, Case No. IPR2018-00208, U.S. Pat. No. 9,568,913, dated Dec. 31, 2018, 100 pages.
Patent Owner's Motion to Amend Appendix—Claim Listing Pursuant to 37 C.F.R. § 42.121, *SZ DJI Technology Co., Ltd. and Parrot Inc. v. Synergy Drone LLC*, Case No. IPR2018-00205, U.S. Pat. No. 8,380,368, 12 pages.
Patent Owner's Motion to Amend Appendix—Claim Listing Pursuant to 37 C.F.R. § 42.121, *SZ DJI Technology Co., Ltd. and Parrot Inc. v. Synergy Drone LLC*, Case No. IPR2018-00206, U.S. Pat. No. 8,649,918, 12 pages.
Patent Owner's Motion to Amend Appendix—Claim Listing pursuant to 37 C.F.R. § 42.121, *SZ DJI Technology Co., Ltd. and Parrot Inc. v. Synergy Drone LLC*, Case No. IPR2018-00207, U.S. Pat. No. 9,079,116, 13 pages.

(56) References Cited

OTHER PUBLICATIONS

Transcript of Videotaped Deposition of Robert John Hansman, Jr.,-*SZ DJI Technology Co., Ltd., and Parrot Inc. v. Synergy Drone LLC*, Case No. IPR2018-00204, U.S. Pat. No. 8,200,375, Boston, Massachusetts, Aug. 31, 2018, 163 pages.
Transcript of Deposition of Edmond Murphy, *SZ DJI Technology Co., and Parrot Inc. v. Synergy Drone LLC*, Case Nos. IPR2018-00204, IPR2018-00205, IPR2018-00206, IPR2018-00207. IPR2018-00208, U.S. Pat. No. 8,200,375, Dec. 18, 2018, 174 pages.
Plaintiff Synergy Drone, LLC's Corrected Opening Claim Construction Brief, Western District of Texas Austin Division, Civil Action Nos. 1:17-cv-00242-LY and 1:17-cv-00243-LY, filed Apr. 23, 2018, 25 pages.
Declaration of R. John Hansman, Jr., Ph D., *SZ DJI Technology Co., Ltd. and Parrot Inc. v. Synergy Drone LLC*, Inter Partes Review, Case No. IPR2018-00204, U.S. Pat. No. 8,200,375, dated Nov. 22, 2017, 274 pages.
Declaration of R. John Hansman, Jr., Ph D., *SZ DJI Technology Co., Ltd. and Parrot Inc. v. Synergy Drone LLC*, Inter Partes Review, Case No. IPR2018-00205, U.S. Pat. No. 8,380,368, dated Nov. 22, 2017, 274 pages.
Declaration of R. John Hansman, Jr., Ph D., *SZ DJI Technology Co., Ltd. and Parrot Inc. v. Synergy Drone LLC*, Inter Partes Review, Case No. IPR2018-00206, U.S. Pat. No. 8,649,918, dated Nov. 22, 2017, 274 pages.
Declaration of R. John Hansman, Jr., Ph D., *SZ DJI Technology Co., Ltd. and Parrot Inc. v. Synergy Drone LLC*, Inter Partes Review, Case No. IPR2018-00207, U.S. Pat. No. 9,079,116, dated Nov. 22, 2017, 274 pages.
Declaration of R. John Hansman, Jr., Ph D., *SZ DJI Technology Co., Ltd. and Parrot Inc. v. Synergy Drone LLC*, Inter Partes Review, Case No. IPR2018-00208, U.S. Pat. No. 9,568,913, dated Nov. 22, 2017, 274 pages.
Hansman, Robert John, JR., Curriculum Vitae, 32 pages.
Miwa, M. et al., "Remote Control Support System Aimed at Support for Aerial Photography Operations by Means of Unmanned Helicopters", Proceedings of 2007 JSME Conference on Robotics and Mechatronics, May 2007, Translation included, 34 pages.
Declaration of Coral Sheldon-Hess dated Nov. 17, 2017, 39 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00204, U.S. Pat. No. 8,200,375, dated Sep. 11, 2018, 44 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00205, U.S. Pat. No. 8,380,368, dated Sep. 11, 2018, 44 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00206, U.S. Pat. No. 8,649,918, dated Sep. 11, 2018, 44 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00207, U.S. Pat. No. 9,079,116, dated Sep. 11, 2018, 44 pages.
Declaration of Dr. Jay P. Kesan, Ph.D., J.D., *SZ DJI Technology Co., Ltd. and Parrot Inc. v. Synergy Drone LLC*, Inter Partes Review, Case No. IPR2018-00208, U.S. Pat. No. 9,568,913, dated Sep. 11, 2018, 44 pages.
Declaration of Edmond J. Murphy, Ph.D., *SZ DJI Technology Co., Ltd. and Parrot Inc. v. Synergy Drone LLC*, Inter Partes Review, Case No. IPR2018-00204, U.S. Pat. No. 8,200,375, dated Dec. 7, 2018, 56 pages.
Declaration of Edmond J. Murphy, Ph.D., *SZ DJI Technology Co., Ltd. and Parrot Inc. v. Synergy Drone LLC*, Inter Partes Review, Case No. IPR2018-00205, U.S. Pat. No. 8,380,368, dated Sep. 11, 2018, 56 pages.
Declaration of Edmond J. Murphy, Ph.D., *SZ DJI Technology Co., Ltd. and Parrot Inc. v. Synergy Drone LLC*, Inter Partes Review, Case No. IPR2018-00206, U.S. Pat. No. 8,649,918, dated Dec. 7, 2018, 56 pages.
Declaration of Edmond J. Murphy, Ph.D., *SZ DJI Technology Co., Ltd. and Parrot Inc. v. Synergy Drone LLC*, Inter Partes Review, Case No. IPR2018-00207, U.S. Pat. No. 9,079,116, dated Dec. 7, 2018, 56 pages.
Declaration of Edmond J. Murphy, Ph.D., *SZ DJI Technology Co., Ltd. and Parrot Inc. v. Synergy Drone LLC*, Inter Partes Review, Case No. IPR2018-00208, U.S. Pat. No. 9,568,913, dated Dec. 7, 2018, 56 pages.
Definition of "Proportional", The American Heritage College Dictionary, Third Edition, Houghton Mifflin Company, 1997, p. 1097.
Definition of "Motion", Webster's New Universal Unabridged Dictionary, Deluxe Second Edition, Dorset & Baber, 1983, p. 1173.
Dictionary of Aeronautical English, Fitzroy Dearborn Publishers, 1999, p. 150.
McGraw-Hill Encyclopedia of Science and Technology, Seventh Edition, 1992, p. 817.
Contents of U.S. Pat. No. 8,200,375 issued Jun. 12, 2012, USPTO, certified Jul. 11, 2017, pp. 1 through 150.
Sato, A. "The RMAX Helicopter UAV," <www.dtic.mil/cgi-bun/GetTRDoc?Location=UZ&doc=GetTRDoc/pdf&AD=ADA427393>, Yamaha Motor Co., Ltd., Sep. 2, 2003, 11 pages.
Hanlon, "Yamaha's RMAX—the worlds most advanced non-military UAV," <https://newatlas.com/go/2440/>, updated Nov. 19, 2004, 5 pages.
Petition for Inter Partes Review for U.S. Pat. No. 9,079,116, *SZ DJI Technology Co., Ltd. and Parrot Inc. v. Synergy Drone LLC*, dated Nov. 22, 2017, 74 pages.
Petition for Inter Partes Review for U.S. Pat. No. 8,380,368, *SZ DJI Technology Co., Ltd. and Parrot Inc. v. Synergy Drone LLC*, dated Nov. 22, 2017, 77 pages.
Petition for Inter Partes Review for U.S. Pat. No. 8,649,918, *SZ DJI Technology Co., Ltd. and Parrot Inc. v. Synergy Drone LLC*, dated Nov. 22, 2017, 78 pages.
Petition for Inter Partes Review for Patent No. 9,568,913, *SZ DJI Technology Co., Ltd. and Parrot Inc. v. Synergy Drone LLC*, dated Nov. 22, 2017, 78 pages.
Petition for Inter Partes Review for U.S. Pat. No. 8,200,375, *SZ DJI Technology Co., Ltd. and Parrot Inc. v. Synergy Drone LLC*, dated Nov. 22, 2017, 81 pages.
Miwa et al., "Remote Control Support System for Aerial Photograph," Nov. 24-25, 2007, pp. 227-229.
Thornberg et al., "Sikorsky Aircraft's Unmanned Aerial Vehicle, Cypher: System Description and Program Accomplishments," Presented at the American Helicopter Society 51st Annual Forum, Fort Worth, TX, May 9-11, 1995, pp. 804 through 811.
Power of Attorney of Synergy Drone, LLC,*SZ DJI Technology Co., Ltd. and Parrot Inc. v. Synergy Drone, LLC*, Case No. IPR2018-00204, U.S. Pat. No. 8,200,375, Dec. 13, 2017, 3 pages.
Power of Attorney of Synergy Drone, LLC,*SZ DJI Technology Co., Ltd. and Parrot Inc. v. Synergy Drone, LLC*, Case No. IPR2018-00205, U.S. Pat. No. 8,380,368, Dec. 13, 2017, 3 pages.
Power of Attorney of Synergy Drone, LLC,*SZ DJI Technology Co., Ltd. and Parrot Inc. v. Synergy Drone, LLC*, Case No. IPR2018-00206, U.S. Pat. No. 8,649,918, Dec. 13, 2017, 3 pages.
Power of Attorney of Synergy Drone, LLC,*SZ DJI Technology Co., Ltd. and Parrot Inc. v. Synergy Drone, LLC*, Case No. IPR2018-00207, U.S. Pat. No. 9,079,116, Dec. 13, 2017, 3 pages.
Power of Attorney of Synergy Drone, LLC,*SZ DJI Technology Co., Ltd. and Parrot Inc. v. Synergy Drone, LLC*, Case No. IPR2018-00208, U.S. Pat. No. 9,568,913, Dec. 13, 2017, 3 pages.
Mandatory Notice by Patent Owner Under 37 CFR § 42.8, *SZ DJI Technology Co., Ltd. and Parrot Inc. v. Synergy Drone, LLC*, Case No. IPR2018-00204, U.S. Pat. No. 8,200,375, Dec. 13, 2017, 4 pages.
Mandatory Notice by Patent Owner Under 37 CFR § 42.8, *SZ DJI Technology Co., Ltd. and Parrot Inc. v. Synergy Drone, LLC*, Case No. IPR2018-00205, U.S. Pat. No. 8,380,368, Dec. 13, 2017, 4 pages.

(56) References Cited

OTHER PUBLICATIONS

Mandatory Notice by Patent Owner Under 37 CFR § 42.8, *SZ DJI Technology Co., Ltd. and Parrot Inc. v. Synergy Drone, LLC*, Case No. IPR2018-00206, U.S. Pat. No. 8,649,918, Dec. 13, 2017, 4 pages.
Mandatory Notice by Patent Owner Under 37 CFR § 42.8, *SZ DJI Technology Co., Ltd. and Parrot Inc. v. Synergy Drone, LLC*, Case No. IPR2018-00207, U.S. Pat. No. 9,079,116, Dec. 13, 2017, 4 pages.
Mandatory Notice by Patent Owner Under 37 CFR § 42.8, *SZ DJI Technology Co., Ltd. and Parrot Inc. v. Synergy Drone, LLC*, Case No. IPR2018-00208, U.S. Pat. No. 9,568,913, Dec. 13, 2017, 4 pages.
Order Conduct Proceedings 37 C.F.R. § 42.5, *SZ DJI Technology Co., Ltd. and Parrot Inc. v. Parrot Inc. v. Drone-Control, LLC*, Case Nos. IPR2018-00204, IPR2018-00205, IPR2018-00206, IPR2018-00207, IPR2018-00208, Feb. 7, 2019, 4 pages.
"Twister Bell Medevac: Ready to Fly 4 Channel R/C Helicopter Assembly & Flight Training guide," Exhibit A, J. Perkins Distribution, <http://www.modelengines.com.au>, 2006, 32 pages.
Miwa et al., "Remote Control Support System for R/C Helicopter," Service Robotics and Mechatronics, Springer, London, 2010, pp. 125-130.
Cooper et al., "Sikorsky Aircraft UAV Development," Nineteenth European Rotorcraft Forum, Paper No. D3, Sep. 14-16, 1993, 10 pages.
Draper, "Advanced UMV Operator Interfaces," Air Force Research Laboratory, Dec. 2005, 11 pages.
Conte, "Navigation Functionalities for an Autonomous UAV Helicopter," Linköping Studies in Science and Technology, Thesis No. 1307, Mar. 2007, 127 pages.
"Yamaha's RMAX Series Unmanned Helicopter," Yamaha News No. 6, Yamaha Motor Co., Ltd., Nov. 1, 2003, 16 pages.
Cycon et al., "Progressive Engagement Clutch," Australian Patent Application No. 66870/90, Application Date Nov. 22, 1990, 16 pages.
Carstens, "Development of a Low-Cost, Low-Weight Flight Control System for an Electrically Powered Model Helicopter," Stellenbosch University, Apr. 2005, 168 pages.
Gerig, "Modeling, guidance, and control of aerobatic maneuvers of an autonomous helicopter," ETH Zürich Research Collection, Dissertation No. 17805, 2008, 179 pages.
McCormack, "The Use of Small Unmanned Aircraft by the Washington State Department of Transportation," Research Report, Report No. WA-RD 703.1, Agreement T4118. Task 04, Unmanned Aerial Vehicles, Jun. 2008, 27 pages.
"Twister Aggressor2.4: Ready to Fly 4 Channel R/C Helicopter Assembly & Flight Training guide," J.Perkins Distribution, <http://modelengines.com.au>, 2008, 28 pages.
"RMAX G1," Yamaha, <https://global.yamaha-motor.com/jp/news/2005/1017/rmax_g1.html>, Oct. 17, 2005, 3 pages.
"TypeIIG (RMAX)," Yamaha, <https://global.yamaha-motor.com/jp/news/2002/0925/sky.html>, Sep. 25, 2002, 3 pages.
Fang, "Design of Flight Control and Managing Computer for a Small Reconnaissance UAV," Institute of UAV, Northwestern Polytechnical University, Xian 710072, China, ,<http://www.cqvip.com>, May 27, 2003, 3 pages.
Pallett et al., "Automatic Flight Control," Fourth Edition, Blackwell Scientific Publications, Oxford, E. H. J. Pallett & S. Coyle, 1993, 3 pages.
Hall et al., "Synthesis of Hover Autopilots for Rotary Wing VTOL Aircraft," SUDAAR No. 446, Guidance and Control Laboratory, Center for Systems Research, Department of Aeronautics and Astronautics, Stanford University, Jun. 1972, 31 pages.
Twister Bell Medevac 2.4: Ready to Fly 4 Channel R/C Helicopter Assembly & Flight Training guide, J. Perkins Distribution, <http://www.jperkinsdistribution.co.uk>, 2007, 32 pages.
Kim et al., "Mathematical Modeling and Experimental Identification of a Model Helicopter," AIAA Journal of Guidance, Control, and Dynamics, Aug. 31, 2000, 34 pages.

Matsushima et al., "Remote Control Support System for AerialPhotograph," Proceedings of the 2007 JSME Conference on Robotics and Mechatronics, 2A2-A07, 2007, 34 pages.
Sakamoto, "Industrial-use Unmanned Helicopter RMAX Type II G," Yamaha Motor Technical Review, Dec. 20, 2002, 4 pages.
"Blade CX2 Manual," E-flite, Horizon Hobby, Inc., 2006, 48 pages.
Voicheck, "An introductory guide for operating Radio Controlled Helicopters," <http://prism2.mem.drexel.edu/~voicheck/>, 2007, 52 pages.
Bouabdallah et al., "Design and Control of an Indoor Coaxial Helicopter," Intelligent Robots and Systems, 2006 IEEE/RSJ International Conference, Jan. 15, 2007, 6 pages.
"Blade CP Pro Manual," E-flite, Horizon Hobby, Inc., 2006, 64 pages.
Duranti et al., "In-flight Identification of the Augmented Flight Dynamics of the Rmax Unmanned Helicopter," 17th IFAC Symposium on Automatic Control in Aerospace, International Federation of Automatic Control, 2007, 7 pages.
Moir et al., "Aircraft Systems Mechanical, electrical, and avionics subsystems integration," Third Edition, John Wiley & Sons, Ltd., Jun. 5, 2008, 7 pages.
Nakata et al., "Remote Control Support System for R/C Helicopter," Proceedings of 2006 JSME Conf. on Robotics & Mechatronics, 2P2-C14, 2006, 8 pages.
Walsh et al., "The Sikorsky Cypher® UAV: A Multi-Purpose Platform with Demonstrated Mission Flexibility," American Helicopter Society 54th Annual Forum, May 1998, 9 pages.
Miwa et al., "Evaluation of Remote Control Support system for Unmanned Helicopter," Nov. 4, 2010, pp. 1034-1036.
Murphy et al., "Applications for mini VTOL UAV for law enforcement," SPIE Proceedings, vol. 3577, Nov. 1998, pp. 35-43.
How et al., "Real-Time Indoor Autonomous Vehicle Test Environment," IEEE Control Systems Magazine, Apr. 2008, pp. 51-64.
Ramos et al., "Environment for Unmanned Helicopter Control System Development: Application Examples," IEEE, 1995, pp. 532-533.
Decision Granting Institution of Inter Partes Review 35 U.S.C. § 314(a), *SZI DJI Technology Co., Ltd. and Parrot Inc. v. Synergy Drone LLC*, Case No. IPR2018-00207, U.S. Pat. No. 9,079,116, Jun. 13, 2018, 24 pages.
Decision Granting Institution of Inter Partes Review 35 U.S.C. § 314, *SZI DJI Technology Co., Ltd. and Parrot Inc. v. Synergy Drone LLC*, Case No. IPR2018-00208, U.S. Pat. No. 9,568,913, Jun. 29, 2018, 28 pages.
Notice of Filing Date Accorded to Petition and Time for Filing Patent Owner Preliminary Response, *SZI DJI Technology Co., Ltd. and Parrot Inc. v. Synergy Drone, Ltd.*, Case No. IPR2018-00207, U.S. Pat. No. 9,079,116, Jan. 4, 2018, 6 pages.
Notice of Filing Date Accorded to Petition and Time for Filing Patent Owner Preliminary Response, *SZI DJI Technology Co., Ltd. and Parrot Inc. v. Synergy Drone, Ltd.*, Case No. IPR2018-00208, U.S. Pat. No. 9,568,913, Jan. 4, 2018, 6 pages.
Notice of Stipulation Adjusting Due Dates 1-3, *SZI DJI Technology Co., Ltd. and Parrot Inc. v. Drone-Control, LLC*, Case No. IPR2018-00207, U.S. Pat. No. 9,079,116, Aug. 31, 2018, 3 pages.
Notice of Stipulation to Modify Due Dates 2, 3, 4, and 5, *SZI DJI Technology Co., Ltd. and Parrot Inc. v. Synergy Drone LLC*, Case No. IPR2018-00207, U.S. Pat. No. 9,079,116, Dec. 12, 2018, 3 pages.
Notice of Stipulation to Modify Due Dates 2, 3, 4, and 5, *SZI DJI Technology Co., Ltd. and Parrot Inc. v. Synergy Drone LLC*, Case No. IPR2018-00206, U.S. Pat. No. 8,649,918, Dec. 12, 2018, 3 pages.
Notice of Stipulation to Modify Due Dates 2, 3, and 4, *SZI DJI Technology Co., Ltd. and Parrot Inc. v. Synergy Drone LLC*,Case No. IPR2018-00208, U.S. Pat. No. 9,568,913, Dec. 12, 2018, 3 pages.
Order Trial Hearing 37 C.F.R. § 42.70, *SZI DJI Technology Co., Ltd. and Parrot Inc. v. Drone-Control, LLC*, Case Nos. IPR2018-00204, IPR2018-00205, IPR2018-00206, IPR2018-00207, IPR2018-00208, Feb. 5, 2019, 6 pages.

(56) References Cited

OTHER PUBLICATIONS

Parties' Joint Request for Oral Argument, *SZI DJI Technology Co., Ltd. and Parrot Inc. v. Synergy Drone LLC*, Case No. IPR2018-00206, U.S. Pat. No. 8,649,918, Feb. 1, 2019, 9 pages.
Parties' Joint Request for Oral Argument, *SZI DJI Technology Co., Ltd. and Parrot Inc. v. Synergy Drone LLC*, Case No. IPR2018-00207, U.S. Pat. No. 9,079,116, Feb. 1, 2019, 9 pages.
Parties' Joint Request for Oral Argument, *SZI DJI Technology Co., Ltd. and Parrot Inc. v. Synergy Drone LLC*, Case No. IPR2018-00208, U.S. Pat. No. 9,568,913, Feb. 1, 2019, 9 pages.
Patent Owner's Motion to Amend Pursuant to 37 C.F.R. § 42.121, *SZI DJI Technology Co., Ltd. and Parrot Inc. v. Synergy Drone LLC*, Case No. IPR2018-00207, U.S. Pat. No. 9,079,116, Sep. 11, 2018, 16 pages.
Patent Owner's Motion to Amend Pursuant to 37 C.F.R. § 42.121, *SZI DJI Technology Co., Ltd. and Parrot Inc. v. Synergy Drone LLC*, Case No. IPR2018-00208, U.S. Pat. No. 9,568,913, Sep. 11, 2018, 18 pages.
Patent Owner's Notice of Deposition of R. John Hansman, Jr., Ph. D. Under 37 C.F.R. § 42.53, *SZI DJI Technology Co., Ltd. and Parrot Inc. v. Synergy Drone, LLC*, Case No. IPR2018-00207, U.S. Pat. No. 9,079,116, Aug. 10, 2018, 3 pages.
Patent Owner's Notice of Deposition of R. John Hansman, Jr., Ph. D. Under 37 C.F.R. § 42.53, *SZI DJI Technology Co., Ltd. and Parrot Inc. v. Synergy Drone, LLC*, Case No. IPR2018-00208, U.S. Pat. No. 9,568,913, Aug. 10, 2018, 3 pages.
Patent Owner's Reply to Petitioners' Opposition to Motion to Amend, *SZI DJI Technology Co., Ltd. and Parrot Inc. v. Drone-Control, LLC*, Case No. IPR2018-00207, U.S. Pat. No. 9,079,116, Jan. 14, 2019, 16 pages.
Patent Owner's Reply to Petitioners' Opposition to Motion to Amend, *SZI DJI Technology Co., Ltd. and Parrot Inc. v. Synergy Drone LLC*, Case No. IPR2018-00206, U.S. Pat. No. 8,649,918, Jan. 14, 2019, 16 pages.
Patent Owner's Reply to Petitioners' Opposition to Motion to Amend, *SZI DJI Technology Co., Ltd. and Parrot Inc. v. Synergy Drone LLC*, Case No. IPR2018-00208, U.S. Pat. No. 9,568,913, Jan. 14, 2019, 16 pages.
Patent Owner's Response to Petition Pursuant to 37 C.F.R. § 42.107(a), *SZI DJI Technology Co., Ltd. and Parrot Inc. v. Synergy Drone LLC*, Case No. IPR2018-00206, U.S. Pat. No. 8,649,918, Dec. 7, 2018, 20 pages.
Patent Owner's Response to Petition Pursuant to 37 C.F.R. § 42.107(a), *SZI DJI Technology Co., Ltd. and Parrot Inc. v. Synergy Drone LLC*, Case No. IPR2018-00208, U.S. Pat. No. 9,568,913, Dec. 7, 2018, 20 pages.
Patent Owner's Response to Petition Pursuant to 37 C.F.R. § 42.107(a), *SZI DJI Technology Co., Ltd. and Parrot Inc. v. Synergy Drone LLC*, Case No. IPR2018-00208, U.S. Pat. No. 9,568,913, Sep. 11, 2018, 20 pages.
Patent Owner's Sur-Reply to Petioners' Reply, *SZI DJI Technology Co., Ltd. and Parrot Inc. v. Drone-Control LLC*, Case No. IPR2018-00208, U.S. Pat. No. 9,568,913, Jan. 14, 2019, 20 pages.
Patent Owner's Sur-Reply to Petitioners' Reply, *SZI DJI Technology Co., Ltd. and Parrot Inc. v. Drone-Control LLC*, Case No. IPR2018-00206, U.S. Pat. No. 8,649,918, Jan. 14, 2019, 20 pages.
Patent Owner's Updated Notice of Deposition of R. John Hansman, Jr., Ph. D. Under 37 C.F.R. § 42.53, *SZI DJI Technology Co., Ltd. and Parrot Inc. v. Drone-Control, LLC*, Case No. IPR2018-00208, U.S. Pat. No. 9,568,913, Aug. 29, 2018, 3 pages.
Patent Owner's Updated Notice of Deposition of R. John Hansman, Jr., Ph.D. Under 37 C.F.R. § 42.53, *SZI DJI Technology Co., Ltd. and Parrot Inc. v. Drone-Control, LLC*, Case No. IPR 2018-00207, U.S. Pat. No. 9,079,116, Aug. 29, 2018, 3 pages.
Petitioners' Updated Exhibit List (as of Dec. 31, 2018), *SZI DJI Technology Co., Ltd. and Parrot Inc. v. Synergy Drone LLC*, Case No. IPR2018-00208, U.S. Pat. No. 9,568,913, Dec. 31, 2018, 4 pages.

Petitioners' Notice of Deposition of Dr. Edmond J. Murphy, *SZI DJI Technology Co., Ltd. and Parrot Inc. v. Synergy Drone LLC*, Case No. IPR2018-00208, U.S. Pat. No. 9,568,913, Dec. 11, 2018, 3 pages.
Petitioners' Notice of Deposition of Dr. Edmond J. Murphy, *SZI DJI Technology Co., Ltd. and Parrot Inc. v. Synergy Drone LLC*, Case No. IPR2018-00206, U.S. Pat. No. 8,649,918, Dec. 11, 2018, 3 pages.
Petitioners' Notice of Deposition of Dr. Edmond J. Murphy, *SZI DJI Technology Co., Ltd. and Parrot Inc. v. Synergy Drone LLC*, Case No. IPR2018-00207, U.S. Pat. No. 9,079,116, Dec. 11, 2018, 3 pages.
Petitioners' Opposition to Motion to Amend, *SZI DJI Technology Co., Ltd. and Parrot Inc. v. Synergy Drone LLC*, Case No. IPR2018-00206, U.S. Pat. No. 8,649,918, Dec. 31, 2018, 29 pages.
Petitioners' Opposition to Motion to Amend, *SZI DJI Technology Co., Ltd. and Parrot Inc. v. Synergy Drone LLC*, Case No. IPR2018-00207, U.S. Pat. No. 9,079,116, Dec. 31, 2018, 29 pages.
Petitioners' Opposition to Motion to Amend, *SZI DJI Technology Co., Ltd. and Parrot Inc. v. Synergy Drone LLC*, Case No. IPR2018-00208, U.S. Pat. No. 9,568,913, Dec. 31, 2018, 29 pages.
Petitioner's Power of Attorney, *SZI DJI Technology Co., Ltd. and Parrot Inc. v. Synergy Drone LLC*, Inter Partes Review of U.S. Pat. No. 9,079,116, Nov. 16, 2017, 2 pages.
Petitioner's Power of Attorney, *SZI DJI Technology Co., Ltd. and Parrot Inc. v. Synergy Drone LLC*, Inter Partes Review of U.S. Pat. No. 9,079,116, Nov. 16, 2017, 3 pages.
Petitioner's Power of Attorney, *SZI DJI Technology Co., Ltd. and Parrot Inc. v. Synergy Drone LLC*, Inter Partes Review of U.S. Pat. No. 9,568,913, Nov. 16, 2017, 2 pages.
Petitioner's Power of Attorney, *SZI DJI Technology Co., Ltd. and Parrot Inc. v. Synergy Drone LLC*, Inter Partes Review of U.S. Pat. No. 9,568,913, Nov. 16, 2017, 3 pages.
Petitioners' Reply, *SZI DJI Technology Co., Ltd. and Parrot Inc. v. Synergy Drone LLC*, Case No. IPR2018-00206, U.S. Pat. No. 8,649,918, Dec. 31, 2018, 28 pages.
Petitioners' Reply, *SZI DJI Technology Co., Ltd. and Parrot Inc. v. Synergy Drone LLC*, Case No. IPR2018-00208, U.S. Pat. No. 9,568,913, Dec. 31, 2018, 28 pages.
Petitioners' Sur-Reply to Patent Owner's Reply to Petitioners' Opposition to Motion to Amend, *SZI DJI Technology Co., Ltd. and Parrot Inc. v. Drone-Control, LLC*, Case No. IPR2018-00207, U.S. Pat. No. 9,079,116, Jan. 28, 2019, 15 pages.
Petitioners' Sur-Reply to Patent Owner's Reply to Petitioners' Opposition to Motion to Amend, *SZI DJI Technology Co., Ltd. and Parrot Inc. v. Synergy Drone LLC*, Case No. IPR2018-00206, U.S. Pat. No. 8,649,918, Jan. 28, 2019, 14 pages.
Petitioners' Sur-Reply to Patent Owner's Reply to Petitioners' Opposition to motion to Amend, *SZI DJI Technology Co., Ltd. and Parrot Inc. v. Synergy Drone LLC*, Case No. IPR2018-00208, U.S. Pat. No. 9,568,913, Jan. 28, 2019, 15 pages.
Petitioners' Updated Exhibit List (as of Dec. 31, 2018), *SZI DJI Technology Co., Ltd. and Parrot Inc. v. Synergy Drone LLC*, Case No. IPR2018-00206, U.S. Pat. No. 8,649,918, Dec. 31, 2018, 4 pages.
Petitioners' Updated Exhibit List (as of Dec. 31, 2018), *SZI DJI Technology Co., Ltd. and Parrot Inc. v. Synergy Drone LLC*, Case No. IPR2018-00207, U.S. Pat. No. 9,079,116, Dec. 31, 2018, 4 pages.
Petitioners' Updated Mandatory Notices, *SZI DJI Technology Co., Ltd. and Parrot Inc. v. Synergy Drone LLC*, Case No. IPR2018-00206, U.S. Pat. No. 8,649,918, Feb. 1, 2019, 4 pages.
Petitioners' Updated Mandatory Notices, *SZI DJI Technology Co., Ltd. and Parrot Inc. v. Synergy Drone LLC*, Case No. IPR2018-00207, U.S. Pat. No. 9,079,116, Feb. 1, 2019, 4 pages.
Petitioners' Updated Mandatory Notices, *SZI DJI Technology Co., Ltd. and Parrot Inc. v. Synergy Drone LLC*, Case No. IPR2018-00208, U.S. Pat. No. 9,568,913, Feb. 1, 2019, 4 pages.
Power of Attorney of Drone-Control, LLC, *SZI DJI Technology Co., Ltd. and Parrot Inc. v. Drone-Control, LLC*, Case No. IPR2018-00206, U.S. Pat. No. 8,649,918, Dec. 18, 2018, 3 pages.

(56) References Cited

OTHER PUBLICATIONS

Power of Attorney of Drone-Control, LLC, *SZ DJI Technology Co., Ltd. and Parrot Inc. v. Drone-Control, LLC*, Case No. IPR2018-00207, U.S. Pat. No. 9,079,116, Aug. 28, 2018, 3 pages.
Power of Attorney of Drone-Control, LLC, *SZ DJI Technology Co., Ltd. and Parrot Inc. v. Drone-Control, LLC*, Case No. IPR2018-00207, U.S. Pat. No. 9,079,116, Dec. 18, 2018, 3 pages.
Power of Attorney of Drone-Control, LLC, *SZ DJI Technology Co., Ltd. and Parrot Inc. v. Drone-Control, LLC*, Case No. IPR2018-00208, U.S. Pat. No. 9,568,913, Aug. 28, 2018, 3 pages.
Power of Attorney of Drone-Control, LLC, *SZ DJI Technology Co., Ltd. and Parrot Inc. v. Drone-Control, LLC*, Case No. IPR2018-00208, U.S. Pat. No. 9,568,913, Dec. 18, 2018, 3 pages.
Scheduling Order 37 C.F.R. § 42.5, *SZ DJI Technology Co., Ltd. and Parrot Inc. v. Synergy Drone LLC*, Case No. IPR2018-00207, U.S. Pat. No. 9,079,116, Jun. 13, 2018, 9 pages.
Scheduling Order and General Instructions 37 C.F.R. § 42.5, *SZ DJI Technology Co., Ltd. and Parrot Inc. v. Synergy Drone LLC*, Case No. IPR2018-00208, U.S. Pat. No. 9,568,913, Jun. 29, 2018, 10 pages.
Updated Mandatory Notice by Patent Owner Under 37 § 42.8, *SZ DJI Technology Co., Ltd. and Parrot Inc. v. Drone-Control, LLC*, Case No. IPR2018-00206, U.S. Pat. No. 8,649,918, Dec. 18, 2018, 5 pages.
Updated Mandatory Notice by Patent Owner Under 37 CFR § 42.8, *SZ DJI Technology Co., Ltd. and Parrot Inc. v. Drone-Control, LLC*, Case No. IPR2018-00207, U.S. Pat. No. 9,079,116, Aug. 29, 2018, 5 pages.
Updated Mandatory Notice by Patent Owner Under 37 CFR § 42.8, *SZ DJI Technology Co., Ltd. and Parrot Inc. v. Drone-Control, LLC*, Case No. IPR2018-00207, U.S. Pat. No. 9,079,116, Dec. 18, 2018, 5 pages.
Updated Mandatory Notice by Patent Owner Under 37 CFR § 42.8, *SZ DJI Technology Co., Ltd. and Parrot Inc. v. Drone-Control, LLC*, Case No. IPR2018-00208, U.S. Pat. No. 9,568,913, Aug. 29, 2018, 5 pages.
Updated Mandatory Notice by Patent Owner Under 37 CFR § 42.8, *SZ DJI Technology Co., Ltd. and Parrot Inc. v. Drone-Control, LLC*, Case No. IPR2018-00208, U.S. Pat. No. 9,568,913, Dec. 18, 2018, 5 pages.
Decision Granting Institution of Inter Partes Review 35 U.S.C. § 314(a), *SZ DJI Technology Co., Ltd. and Parrot Inc. v. Synergy Drone LLC*, Case No. IPR2018-00204, U.S. Pat. No. 8,200,375, May 31, 2018, 23 pages.
Decision Granting Institution of Inter Partes Review 35 U.S.C. § 314(a), *SZ DJI Technology Co., Ltd. and Parrot Inc., v. Synergy Drone LLC*, Case No. IPR2018-00205, U.S. Pat. No. 8,380,368, May 31, 2018, 21 pages.
Decision Granting Institution of Inter Partes Review 35 U.S.C. § 314, *SZ DJI Technology Co., Ltd. and Parrot Inc. v. Synergy Drone LLC*, Case No. IPR2018-00206, U.S. Pat. No. 8,649,918, May 31, 2018, 26 pages.
Notice of Filing Date Accorded to Petition and Time for Filing Patent Owner Preliminary Response, *SZ DJI Technology Co., Ltd. and Parrot Inc. v. Synergy Drone LLC*, Case No. IPR2018-00204, U.S. Pat. No. 8,200,375, Dec. 4, 2017, 5 pages.
Notice of Filing Date Accorded to Petition and Time for Filing Patent Owner Preliminary Response, *SZ DJI Technology Co., Ltd. and Parrot Inc. v. Synergy Drone LLC*, Case No. IPR2018-00206, U.S. Pat. No. 8,649,918, mailed Dec. 4, 2017, 5 pages.
Notice of Filing Date Accorded to Petition and Time for Filing Patent Owner Preliminary Response, *SZ DJI Technology Co., Ltd. and Parrot Inc.v. Synergy Drone LLC*, Case No. IPR2018-00205, U.S. Pat. No. 8,380,368, mailed Dec. 4, 2017, 5 pages.
Notice of Stipulation Adjusting Due Dates 1-3, *SZ DJI Technology Co., Ltd. and Parrot Inc. v. Drone-Control, LLC*, Case No. IPR2018-00204, U.S. Pat. No. 8,200,375, Aug. 29, 2018, 3 pages.
Notice of Stipulation Adjusting Due Dates 1-3, *SZ DJI Technology Co., Ltd. and Parrot Inc. v. Drone-Control, LLC*, Case No. IPR2018-00205, U.S. Pat. No. 8,380,368, Aug. 29, 2018, 3 pages.
Notice of Stipulation Adjusting Due Dates 1-3, *SZ DJI Technology Co., Ltd. and Parrot Inc.v. Drone-Control, LLC*, Case No. IPR2018-00206, U.S. Pat. No. 8,649,918, Aug. 31, 2018, 3 pages.
Notice of Stipulation to Modify Due Dates 2, 3, 4, and 5, *SZ DJI Technology and Parrot Inc. v. Synergy Drone LLC*, Case No. IPR2018-00205, U.S. Pat. No. 8,380,368, Dec. 12, 2018, 3 pages.
Notice of Stipulation to Modify Due Dates 2, 3, 4, and 5, *SZ DJI Technology Co., Ltd. and Parrot Inc. v. Synergy Drone LLC*, Case No. IPR2018-00204, U.S. Pat. No. 8,200,375, Dec. 12, 2018, 3 pages.
Order Conduct of the Proceeding 37 C.F.R. § 42.5, *SZ DJI Technology Co., Ltd. and Parrot Inc. v. Synergy Drone LLC*, Case Nos. IPR2018-00204, IPR2018-00205, IPR2018-00206, IPR2018-00207, IPR2018-00208, Nov. 21, 2018, 5 pages.
Order Conduct of the Proceeding 37 C.F.R. § 42.5, *SZ DJI Technology Co., Ltd. and Parrot Inc. v. Synergy Drone LLC*, Case Nos. IPR2018-00204, PR2018-00205, IPR2018-00206, IPR2018-00207, IPR2018-00208, Aug. 23, 2018, 5 pages.
Parties' Joint Request for Oral Argument, *SZ DJI Technology Co., Ltd. and Parrot Inc. v. Synergy Drone LLC*, Case No. IPR2018-00205, U.S. Pat. No. 8,380,368, Feb. 1, 2019, 9 pages.
Parties' Joint Request for Oral Argument, *SZ DJI Technology Co., Ltd. and Parrot Inc. v. Synergy Drone LLC*. Case No. IPR2018-00204, U.S. Pat. No. 8,200,375, Feb. 1, 2019, 9 pages.
Patent Owner's Motion to Amend Pursuant to 37 C.F.R. § 42.121, *SZ DJI Technology Co., Ltd. and Parrot Inc. v. Synergy Drone LLC*, Case No. IPR2018-00205, U.S. Pat. No. 8,380,368, Sep. 11, 2018, 15 pages.
Patent Owner's Motion to Amend Pursuant to 37 C.F.R. § 42.121, *SZ DJI Technology Co., Ltd. and Parrot Inc. v. Synergy Drone LLC*, Case No. IPR2018-00206, U.S. Pat. No. 8,649,918, Sep. 11, 2018, 15 pages.
Patent Owner's Notice of Deposition of R. John Hansman, Jr., Ph.D. Under 37 C.F.R. § 42.53, *SZ DJI Technology Co., Ltd. and Parrot Inc. v. Synergy Drone, LLC*, Case No. IPR2018-00204, U.S. Pat. No. 8,200,375, Aug. 10, 2018, 3 pages.
Patent Owner's Notice of Deposition of R. John Hansman, Jr., Ph.D. Under 37 C.F.R. § 42.53, *SZ DJI Technology Co., Ltd. and Parrot Inc. v. Synergy Drone, LLC*, Case No. IPR2018-00205, U.S. Pat. No. 8,380,368, Aug. 10, 2018, 3 pages.
Patent Owner's Notice of Deposition of R. John Hansman, Jr., Ph.D. Under 37 C.F.R. § 42.53, *SZ DJI Technology Co., Ltd. and Parrot Inc. v. Synergy Drone, LLC*, Case No. IPR2018-00206, U.S. Pat. No. 8,649,918, Aug. 10, 2018, 3 pages.
Patent Owner's Reply to Petitioners' Opposition to Motion to Amend, *SZ DJI Technology Co., Ltd. and Parrot Inc. v. Drone-Control, LLC*, Case No. IPR2018-00205, U.S. Pat. No. 8,380,368, Jan. 14, 2019, 16 pages.
Patent Owner's Response to Petition Pursuant to 37 C.F.R. § 42.107(a), *SZ DJI Technology Co., Ltd. and Parrot Inc. v. Synergy Drone LLC*, Case No. IPR2018-00204, U.S. Pat. No. 8,200,375, Dec. 7, 2018, 20 pages.
Patent Owner's Response to Petition Pursuant to 37 C.F.R. § 42.107(a), *SZ DJI Technology Co., Ltd. and Parrot Inc. v. Synergy Drone LLC*, Case No. IPR2018-00204, U.S. Pat. No. 8,200,375, Sep. 11, 2018, 20 pages.
Patent Owner's Response to Petition Pursuant to 37 C.F.R. § 42.107(a), *SZ DJI Technology Co., Ltd. and Parrot Inc. v. Synergy Drone LLC*, Case No. IPR2018-00205, U.S. Pat. No. 8,380,368, Dec. 7, 2018, 20 pages.
Patent Owner's Response to Petition Pursuant to 37 C.F.R. § 42.107(a), *SZ DJI Technology Co., Ltd. and Parrot Inc. v. Synergy Drone LLC*, Case No. IPR2018-00205, U.S. Pat. No. 8,380,368, Sep. 11, 2018, 20 pages.
Patent Owner's Response to Petition Pursuant to 37 C.F.R. § 42.107(a), *SZ DJI Technology Co., Ltd. and Parrot Inc. v. Synergy Drone LLC*, Case No. IPR2018-00206, U.S. Pat. No. 8,649,918, Sep. 11, 2018, 20 pages.
Patent Owner's Sur-Reply to Petitioners' Reply, *SZ DJI Technology Co., Ltd. and Parrot Inc. v. Drone-Control, LLC*, Case No. IPR2018-00204, U.S. Pat. No. 8,200,375, Jan. 14, 2019, 20 pages.

(56) References Cited

OTHER PUBLICATIONS

Patent Owner's Sur-Reply to Petitioners' Reply, *SZ DJI Technology Co., Ltd. and Parrot Inc. v. Drone-Control, LLC*, Case No. IPR2018-00205, U.S. Pat. No. 8,380,368, Jan. 14, 2019, 20 pages.
Patent Owner's Updated Notice of Deposition of R. John Hansman, Jr., Ph.D. Under 37 C.F.R. § 42.53, *SZ DJI Technology Co., Ltd. and Parrot Inc. v. Drone-Control, LLC*, Case No. IPR2018-00205, U.S. Pat. No. 8,380,368, Aug. 29, 2018, 3 pages.
Patent Owner's Updated Notice of Deposition of R. John Hansman, Jr., Ph.D. Under 37 C.F.R. § 42.53, *SZ DJI Technology Co., Ltd. and Parrot Inc. v. Drone-Control, LLC*, Case No. IPR2018-00204, U.S. Pat. No. 8,200,375, Aug. 29, 2018, 3 pages.
Patent Owner's Updated Notice of Deposition of R. John Hansman, Jr., Ph.D. Under 37 C.F.R. § 42.53, *SZ DJI Technology Co., Ltd. and Parrot Inc. v. Drone-Control, LLC*, Case No. IPR2018-00206, U.S. Pat. No. 8,649,918, Aug. 29, 2018, 3 pages.
Petitioners' Notice of Deposition of Dr. Edmond J. Murphy, *SZ DJI Technology Co., Ltd. and Parrot Inc. v. Synergy Drone LLC*, Case No. IPR2018-00204, U.S. Pat. No. 8,200,375, Dec. 11, 2018, 3 pages.
Petitioners' Notice of Deposition of Dr. Edmond J. Murphy, *SZ DJI Technology Co., Ltd. and Parrot Inc. v. Synergy Drone LLC*, Case No. IPR2018-00205, U.S. Pat. No. 8,380,368, Dec. 11, 2018, 3 pages.
Petitioners' Notice of Deposition of Dr. Edmond J. Murphy, *SZ DJI Technology Co., Ltd. and Parrot Inc., v. Synergy Drone LLC*, Case No. IPR2018-00206, U.S. Pat. No. 8,649,918, Dec. 11, 2018, 3 pages.
Petitioners' Opposition to Motion to Amend, *SZ DJI Technology Co., Ltd. and Parrot Inc. v. Synergy Drone LLC*, Case No. IPR2018-00205, U.S. Pat. No. 8,380,368, Dec. 31, 2018, 29 pages.
Petitioner's Power of Attorney, *SZ DJI Technology Co., Ltd. and Parrot Inc. v. Synergy Drone LLC*, Inter Partes Review of U.S. Pat. No. 8,200,375, Nov. 16, 2017, 2 pages.
Petitioner's Power of Attorney, *SZ DJI Technology Co., Ltd. and Parrot Inc. v. Synergy Drone LLC*, Inter Partes Review of U.S. Pat. No. 8,200,375, Nov. 16, 2017, 3 pages.
Petitioner's Power of Attorney, *SZ DJI Technology Co., Ltd. and Parrot Inc. v. Synergy Drone LLC*, Inter Partes Review of U.S. Pat. No. 8,380,368, Nov. 16, 2017, 2 pages.
Petitioner's Power of Attorney, *SZ DJI Technology Co., Ltd. and Parrot Inc. v. Synergy Drone LLC*, Inter Partes Review of U.S. Pat. No. 8,380,368, Nov. 16, 2017, 3 pages.
Petitioner's Power of Attorney, *SZ DJI Technology Co., Ltd. and Parrot Inc. v. Synergy Drone LLC*, Inter Partes Review of U.S. Pat. No. 8,649,918, Nov. 16, 2017, 2 pages.
Petitioner's Power of Attorney, *SZ DJI Technology Co., Ltd. and Parrot Inc. v. Synergy Drone LLC*, Inter Partes Review of U.S. Pat. No. 8,649,918, Nov. 16, 2017, 3 pages.
Petitioners' Reply, *SZ DJI Technology Co., Ltd. and Parrot Inc. v. Synergy Drone LLC*, Case No. IPR2018-00204, U.S. Pat. No. 8,200,375, Dec. 31, 2018, 28 pages.
Petitioners' Reply, *SZ DJI Technology Co., Ltd. and Parrot Inc. v. Synergy Drone LLC*, Case No. IPR2018-00205, U.S. Pat. No. 8,380,368, Dec. 31, 2018, 28 pages.
Petitioners' Sur-Reply to Patent Owner's Reply to Petitioners' Opposition to Motion to Amend, *SZ DJI Technology Co., Ltd. and Parrot Inc. v. Synergy Drone LLC*, Case No. IPR2018-00205, U.S. Pat. No. 8,380,368, Dec. 28, 2019, 14 pages.
Petitioners' Updated Exhibit List (as of Dec. 31, 2018), *SZ DJI Technology Co., Ltd. and Parrot Inc. v. Synergy Drone LLC*, Case No. IPR2018-00204, U.S. Pat. No. 8,200,375, Dec. 31, 2018, 4 pages.
Petitioners' Updated Exhibit List (as of Dec. 31, 2018), *SZ DJI Technology Co., Ltd. and Parrot Inc. v. Synergy Drone LLC*, Case No. IPR2018-00205, U.S. Pat. No. 8,380,368, Dec. 31, 2018, 4 pages.
Petitioners' Updated Mandatory Notices, *SZ DJI Technology Co., Ltd. and Parrot Inc. v. Synergy Drone LLC*, Case No. IPR2018-00204, U.S. Pat. No. 8,200,375, Feb. 1, 2019, 4 pages.
Petitioners' Updated Mandatory Notices, *SZ DJI Technology Co., Ltd. and Parrot Inc. v. Synergy Drone LLC*, Case No. IPR2018-00205, U.S. Pat. No. 8,380,368, Feb. 1, 2019, 4 pages.
Power of Attorney of Drone-Control, LLC, *SZ DJI Technology Co., Ltd. and Parrot Inc. v. Drone-Control, LLC*, Case No. IPR2018-00204, U.S. Pat. No. 8,200,375, Aug. 28, 2018, 3 pages.
Power of Attorney of Drone-Control, LLC, *SZ DJI Technology Co., Ltd. and Parrot Inc. v. Drone-Control, LLC*, Case No. IPR2018-00205, U.S. Pat. No. 8,380,368, Aug. 29, 2018, 3 pages.
Power of Attorney of Drone-Control, LLC, *SZ DJI Technology Co., Ltd. and Parrot Inc. v. Drone-Control, LLC*, Case No. IPR2018-00205, U.S. Pat. No. 8,380,368, Dec. 18, 2018, 3 pages.
Power of Attorney of Drone-Control, LLC, *SZ DJI Technology Co., Ltd. and Parrot Inc.v. Drone-Control, LLC*, Case No. IPR2018-00204, U.S. Pat. No. 8,200,375, Dec. 18, 2018, 3 pages.
Power of Attorney of Drone-Control, LLC, *SZ DJI Technology Co., Ltd. and Parrot Inc.v. Drone-Control, LLC*, Case No. IPR2018-00206, U.S. Pat. No. 8,649,918, Aug. 28, 2018, 3 pages.
Scheduling Order 37 C.F.R. § 42.5, *SZ DJI Technology Co., Ltd. and Parrot Inc. v. Synergy Drone LLC*, Case and Patent Nos. IPR2018-00204 (U.S. Pat. No. 8,200,375), IPR2018-00205 (U.S. Pat. No. 8,380,368) IPR2018-00206 (U.S. Pat. No. 8,649,918), Jun. 1, 2018, 9 pages.
Updated Mandatory Notice by Patent Owner Under 37 CFR § 42.8, *SZ DJI Technology Co., Ltd. and Parrot Inc. v. Drone-Control, LLC*, Case IPR2018-00205, U.S. Pat. No. 8,380,368, Dec. 18, 2018, 5 pages.
Updated Mandatory Notice by Patent Owner Under 37 CFR § 42.8, *SZI DJI Technology Co., Ltd. and Parrot Inc. v. Drone-Control, LLC*, Case No. IPR2018-00204, U.S. Pat. No. 8,200,375, Aug. 29, 2018, 5 pages.
Updated Mandatory Notice by Patent Owner Under 37 CFR § 42.8, *SZ DJI Technology Co., Ltd. and Parrot Inc. v. Drone-Control, LLC*, Case No. IPR2018-00204, U.S. Pat. No. 8,200,375, Dec. 18, 2018, 5 pages.
Updated Mandatory Notice by Patent Owner Under 37 CFR § 42.8, *SZ DJI Technology Co., Ltd. and Parrot Inc. v. Drone-Control, LLC*, Case No. IPR2018-00205, U.S. Pat. No. 8,380,368, Aug. 29, 2018, 5 pages.
Updated Mandatory Notice by Patent Owner Under 37 CFR § 42.8, *SZ DJI Technology Co., Ltd. and Parrot Inc. v. Drone-Control, LLC*, Case No. IPR2018-00206, U.S. Pat. No. 8,649,918, Aug. 29, 2018, 5 pages.

\* cited by examiner

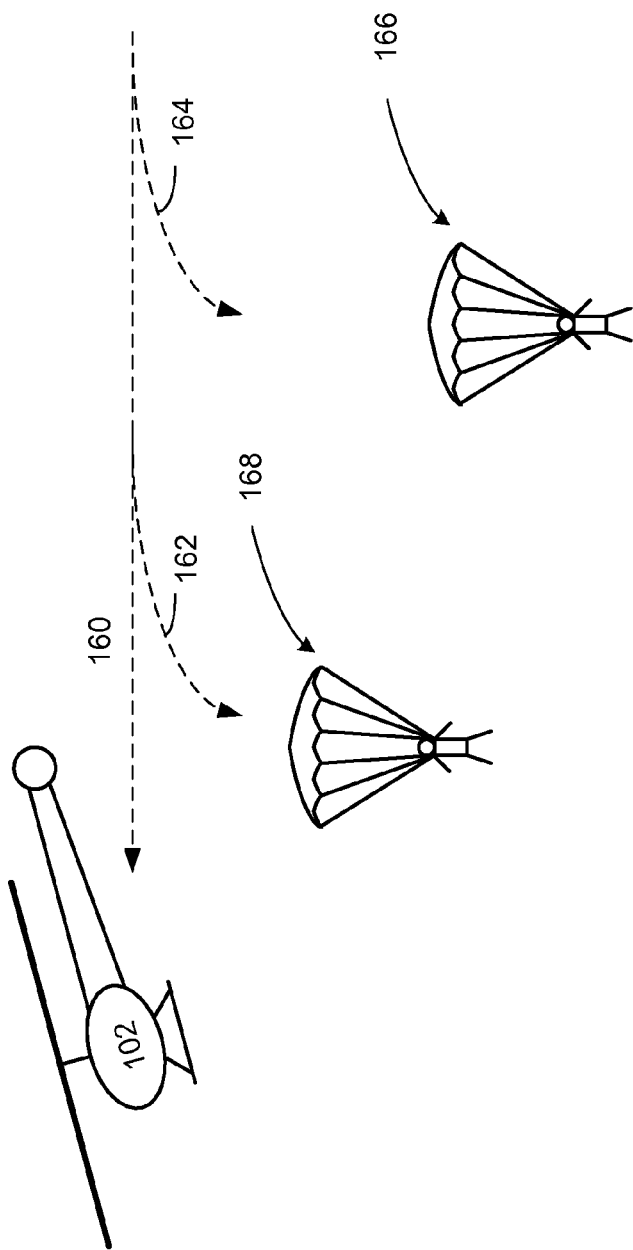

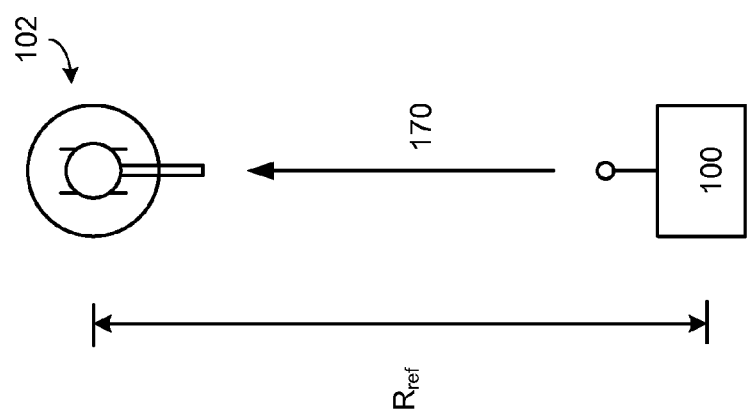

RADIO CONTROLLED AIRCRAFT, REMOTE CONTROLLER AND METHODS FOR USE THEREWITH

CROSS REFERENCE TO RELATED APPLICATIONS

The present application claims priority from and is a continuation of U.S. patent application Ser. No. 15/392,687, filed on Dec. 28, 2016, which claims priority from and is a continuation of U.S. patent application Ser. No. 14/724,037, filed on May 28, 2015, now issued as U.S. Pat. No. 9,568,913, which claims priority from and is a continuation of U.S. patent application Ser. No. 14/102,995, filed on Dec. 11, 2013, now issued as U.S. Pat. No. 9,079,116, which claims priority from and is a continuation of U.S. patent application Ser. No. 13/688,886, filed on Nov. 29, 2012, now issued as U.S. Pat. No. 8,649,918, which claims priority from and is a continuation of U.S. patent application Ser. No. 13/471,642, filed on May 15, 2012, now issued as U.S. Pat. No. 8,380,368, which claims priority from and is a divisional of U.S. patent application Ser. No. 12/029,470, filed on Feb. 12, 2008, now issued as U.S. Pat. No. 8,200,375. The contents of each of these applications are incorporated by reference herein in their entirety.

BACKGROUND

This invention relates generally to radio controlled toys such as airplanes and helicopters.

DESCRIPTION OF RELATED ART

Radio controlled toys such as airplanes, boats, cars and helicopters are popular. Through the use of a remote control, a user can control the motion of the toy. Radio signals from the remote control, containing commands from the user, are sent to the toy to control the motion of the toy. Some radio control devices, such as airplanes and helicopters can be very difficult to control. These devices operate in three-dimensional space and can require great skill on the part of the user to operate. In particular, the user is required to consider the perspective of an aircraft when operating the remote control. The same commands that would make the aircraft turn right when the aircraft is moving toward the user, make the aircraft turn left when traveling away from the user. Simpler controls are needed to enable these devices to be operated by users with less training or skill.

Further limitations and disadvantages of conventional and traditional approaches will become apparent to one of ordinary skill in the art through comparison of such systems with the present invention.

SUMMARY

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 8 is a pictorial representation of a radio controlled aircraft 102 launching parachutists 166 and 168 in accordance with an embodiment of the present invention.

FIG. 9 is a pictorial/block diagram representation of the set-up of remote control device 100 and radio controlled aircraft 102 in accordance with an embodiment of the present invention.

Figure 10:
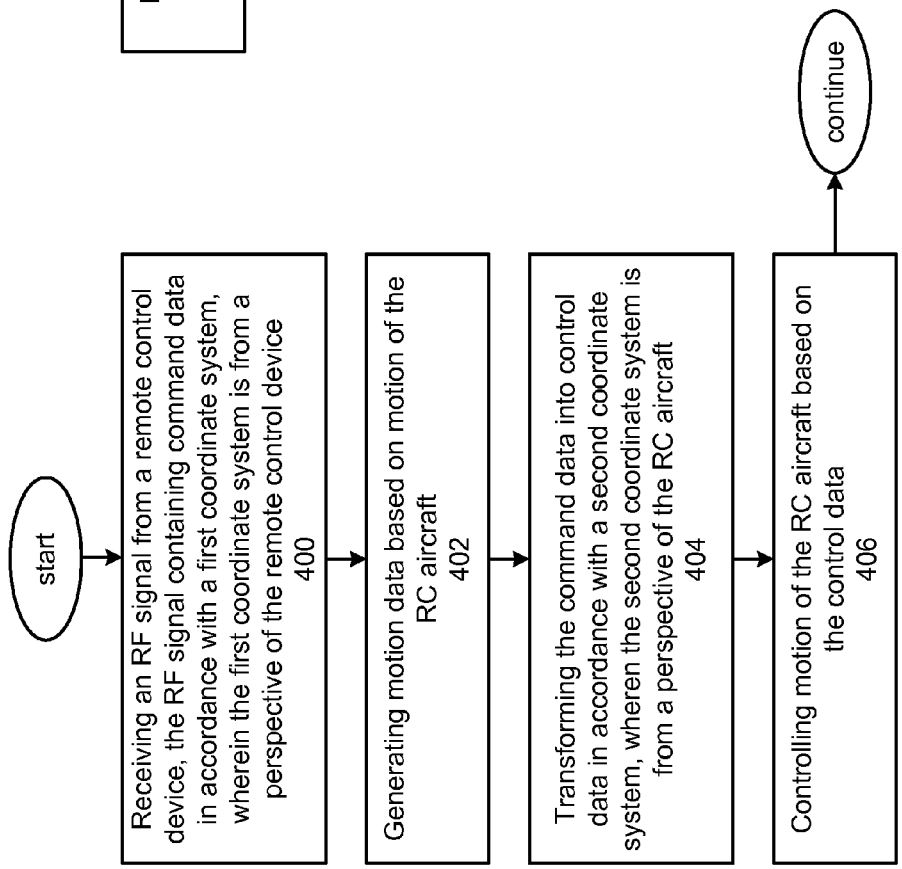

FIG. 10 is a flowchart representation of a method in accordance with an embodiment of the present invention.

Figure 11:
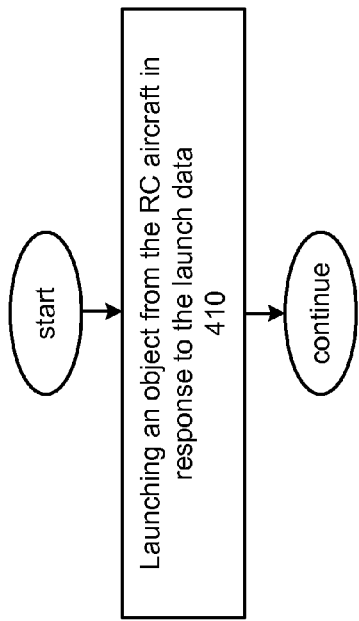

FIG. 11 is a flowchart representation of a method in accordance with an embodiment of the present invention.

DETAILED DESCRIPTION

Figure 1:
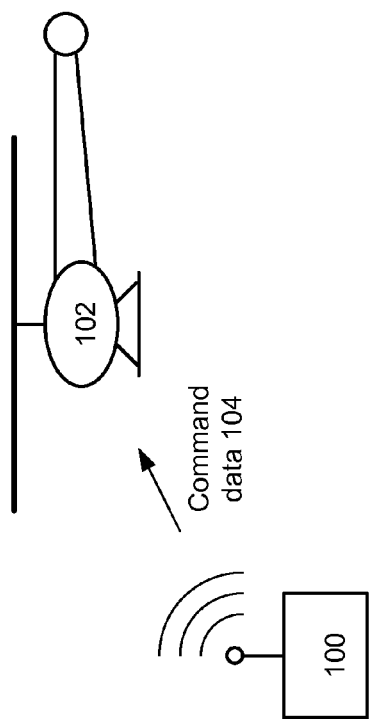
FIG. 1 is a pictorial/block diagram representation of a remote control device 100 and radio controlled aircraft 102 in accordance with an embodiment of the present invention.

FIG. 1 is a pictorial/block diagram representation of a remote control device 100 and radio controlled aircraft 102 in accordance with an embodiment of the present invention. In particular, a radio controlled (RC) aircraft 102, such as a helicopter or other aircraft, operates in response to command data 104 received from remote control device 100. In particular, remote control 104 and/or RC aircraft 102 are configured to provide an easier operation by the user. While described in terms of the operation an RC aircraft, other RC devices such as cars and boats can likewise be implemented in accordance with the present invention.

Several enhancements are presented along with various optional features that will be described in greater detail in conjunction with FIGS. 2-11 that follow.

Figure 2:
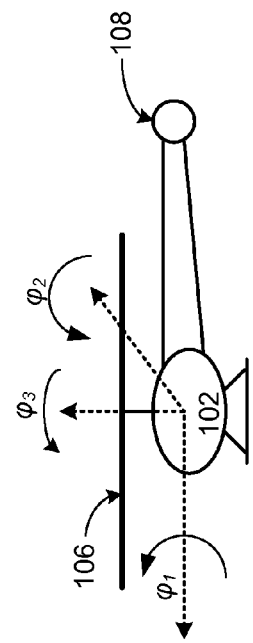
FIG. 2 is a pictorial/graphical representation that illustrates roll, pitch and yaw from the perspective of radio controlled aircraft 102 in accordance with an embodiment of the present invention.

FIG. 2 is a pictorial/graphical representation that illustrates roll, pitch and yaw axes from the perspective of radio controlled aircraft 102 in accordance with an embodiment of the present invention. A coordinate system is shown that is aligned from the perspective of the aircraft, and in particular from the perspective of an imaginary pilot of the RC aircraft 102. This aircraft coordinate system provides a way to describe the orientation of the RC aircraft 102 in three-dimensional space in terms of the angular displacements, roll, pitch and yaw.

In this coordinate system, clockwise rotation about a roll axis, aligned longitudinally along the length of the aircraft from the front to the tail, is represented by $\varphi_1$. When viewed from the back of the RC aircraft 102, clockwise rotation corresponds to a positive roll. Further, rotation about a pitch axis, aligned longitudinally from right to left through the center of the cockpit and perpendicular to the roll axis, is represented by $\varphi_2$. In this coordinate system, forward pitch of the aircraft 102 is positive pitch. The yaw-axis extends vertically through the shaft of main rotor 106 with counter-clockwise displacement represented by $\varphi_3$.

In an embodiment of the present invention, the aircraft 102 includes one or more controls that allow the aircraft to be rotated by an amount $\varphi_1$ about the roll axis, an amount $\varphi_2$ about the pitch axis and an amount $\varphi_3$ about the yaw axis. For instance, in an embodiment where RC aircraft 102 is implemented as a helicopter, forward and backward tilt of the main rotor 106 cause, respectively, positive and negative pitch angles $\varphi_2$. In addition, right and left tilts of the main rotor 106, cause, respectively, positive and negative roll angles $\varphi_1$. Further, the net thrust produced by the tail rotor, taking into consideration any torque induced by the rotation of main rotor 106, produces a yaw angle $\varphi_3$.

In an embodiment of the present invention, command data 104 from the remote control device 100 are generated in a different coordinate system, such as a user coordinate system that corresponds to the orientation of the user. This command data 104 can be transformed into control data in the coordinate system of the aircraft so that the RC aircraft 102 can be controlled based on its orientation to the user, rather than the orientation of an imaginary pilot. The generation of command data 104 and the transformation into control data used to control the orientation of the RC aircraft 102 will be discussed further in conjunction with FIGS. 5 and 6.

Figure 4:
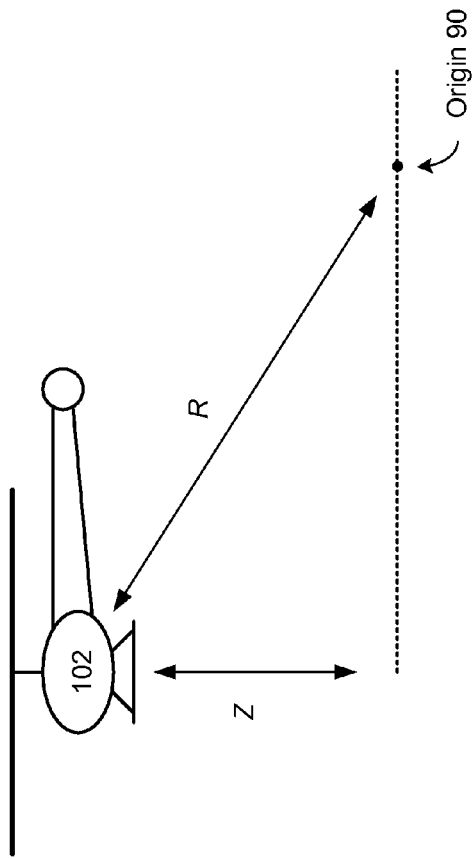
FIG. 4 is a pictorial/graphical representation that illustrates distance and altitude coordinates of radio controlled aircraft 102 with respect to the user coordinate system in accordance with an embodiment of the present invention.
Figure 3:
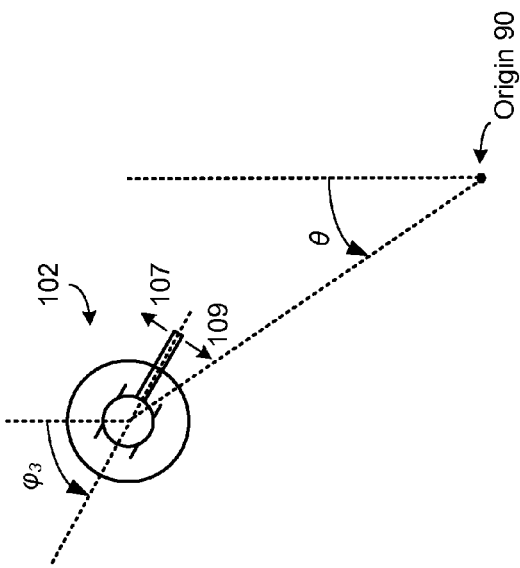
FIG. 3 is a pictorial/graphical representation that illustrates a yaw-axis from the perspective of radio controlled aircraft 102 and an angular orientation with respect to a user coordinate system in accordance with an embodiment of the present invention.

FIG. 3 is a pictorial/graphical representation that illustrates a yaw-axis from the perspective of radio controlled aircraft 102 and an angular orientation with respect to a user coordinate system in accordance with an embodiment of the present invention. FIG. 4 is a pictorial/graphical representation that illustrates distance and altitude coordinates of radio controlled aircraft 102 with respect to the user coordinate system in accordance with an embodiment of the present invention. In particular, rotation about a yaw-axis is shown in FIG. 3 in the aircraft coordinate system. In this coordinate system, the yaw-axis extends vertically through the shaft of main rotor 106 with a counter-clockwise angular displacement represented by $\varphi_3$. In an embodiment where RC aircraft 102 is implemented as a helicopter, a net counter-clockwise thrust 107 generated by the tail rotor 108 causes a positive deviation in the yaw $\varphi_3$. A net clockwise thrust 109 generated by the tail rotor 108 causes a negative deviation in the yaw $\varphi_3$.

The origin 90 indicates the placement of the origin of a user coordinate system that corresponds to the perspective of the user. In an embodiment of the present invention, the user coordinate system is a polar coordinate system. The position of RC aircraft 102 relative to the origin 90, can be represented by the altitude Z of the aircraft in relation to the origin 90, the distance R from the aircraft to the origin 90, and the angular displacement $\theta$ of the aircraft. In summary, the position of the RC aircraft 102 in three dimensional space can be represented in terms of (R, $\theta$, Z) and the orientation of the aircraft can be represented in terms of ($\varphi_1$, $\varphi_2$, $\varphi_3$).

Figure 5:
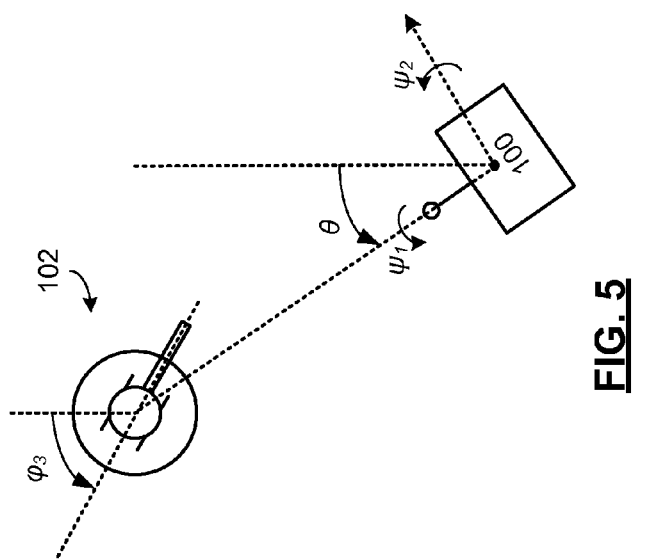
FIG. 5 is a pictorial/graphical representation that further illustrates the perspective of radio controlled aircraft 102 with respect to the remote control device 100 in accordance with an embodiment of the present invention.

FIG. 5 is a pictorial/graphical representation that further illustrates the perspective of radio controlled aircraft 102 with respect to the remote control device 100 in accordance with an embodiment of the present invention. In particular, this configuration assumes that the user of the remote control device would orient the device with changes of $\theta$, in order to face the RC aircraft 102, regardless of its position. In this configuration, if $\theta=\varphi_3$, pitch-axis commands from the perspective of the remote control device 100, represented by $\psi_2$, and roll-axis commands from the perspective of the remote control device 100, represented by $\psi_1$, correspond directly to pitch-axis controls $\varphi_2$ and roll-axis controls $\varphi_1$ of the RC aircraft 102. When however, $\theta \neq \varphi_3$, the implementation of a pitch-axis command $\psi_2$, generally requires both roll-axis and pitch axis controls $\varphi_1$, $\varphi_2$. Similarly, the implementation of a roll-axis command $\psi_1$, generally requires also both roll-axis and pitch axis controls $\varphi_1$, $\varphi_2$.

In an embodiment of the present invention, remote control device 100 generates command data 104 that includes orientation commands $\psi_1$, $\psi_2$. RC aircraft 102 is capable of determining position parameters such as $\theta$ and $\varphi_3$ based on motion data generated by on-board motion sensors. RC aircraft 102 transforms the orientation commands $\psi_1$, $\psi_2$ into control data such as roll-axis and pitch axis controls $\varphi_1$, $\varphi_2$ as follows:

$$\varphi_1 = \psi_1 \cos(\varphi_3 - \theta) + \psi_2 \sin(\varphi_3 - \theta) \qquad (1)$$

$$\varphi_2 = \psi_2 \cos(\varphi_3 - \theta) - \psi_1 \sin(\varphi_3 - \theta) \qquad (2)$$

In this fashion, when a user commands the RC aircraft 102 to pitch forward, the RC aircraft will pitch forward from the perspective of the user, regardless of the actual orientation of the RC aircraft. In practice, a command to pitch forward could be implemented with a pitch forward control if the RC aircraft is facing away from the remote control device 100—when the user is oriented directly with the position of an imaginary pilot. However, other orientations yield other results:

- if the RC aircraft is facing toward the remote control device 100, a command to pitch forward could be implemented with a pitch backward control;
- if the RC aircraft is facing perpendicular to the remote control device 100, a command to pitch forward could be implemented with either a roll-right control or a roll-left control, depending on whether $\theta - \varphi_3 = 90°$ or $\theta - \varphi_3 = -90°$;

In other circumstances, some other combination of both roll-axis and pitch-axis controls $\varphi_1$, $\varphi_2$ is required, as set forth in the equations (1) and (2) above. Using these transformations, a remote control device 100 can command the RC aircraft 102 from the perspective of a user, independent of a yaw-orientation of the RC aircraft. For instance, when a user commands the RC aircraft 102 to pitch-forward or roll-left (from the user's perspective), the RC aircraft pitches forward or rolls left, regardless of the value of $\theta$ or $\varphi_3$.

In an embodiment of the present invention, RC aircraft 102 responds to a lift control L that controls the lift generated by varying either the velocity or pitch of the main rotor 106 and a yaw-axis control V that generates a positive or negative net thrust from the tail rotor 108. Remote control 100 generates a yaw-velocity command $v = d\varphi_3/dt$, and generates a lift command l to control the yaw-axis velocity and lift in a convention fashion, for instance L is equal to or proportion to l and V is equal to or proportional to l. Remote control 100 can optionally generate additional controls for controlling other control functions as well as other features of the RC aircraft 102.

Figure 6:
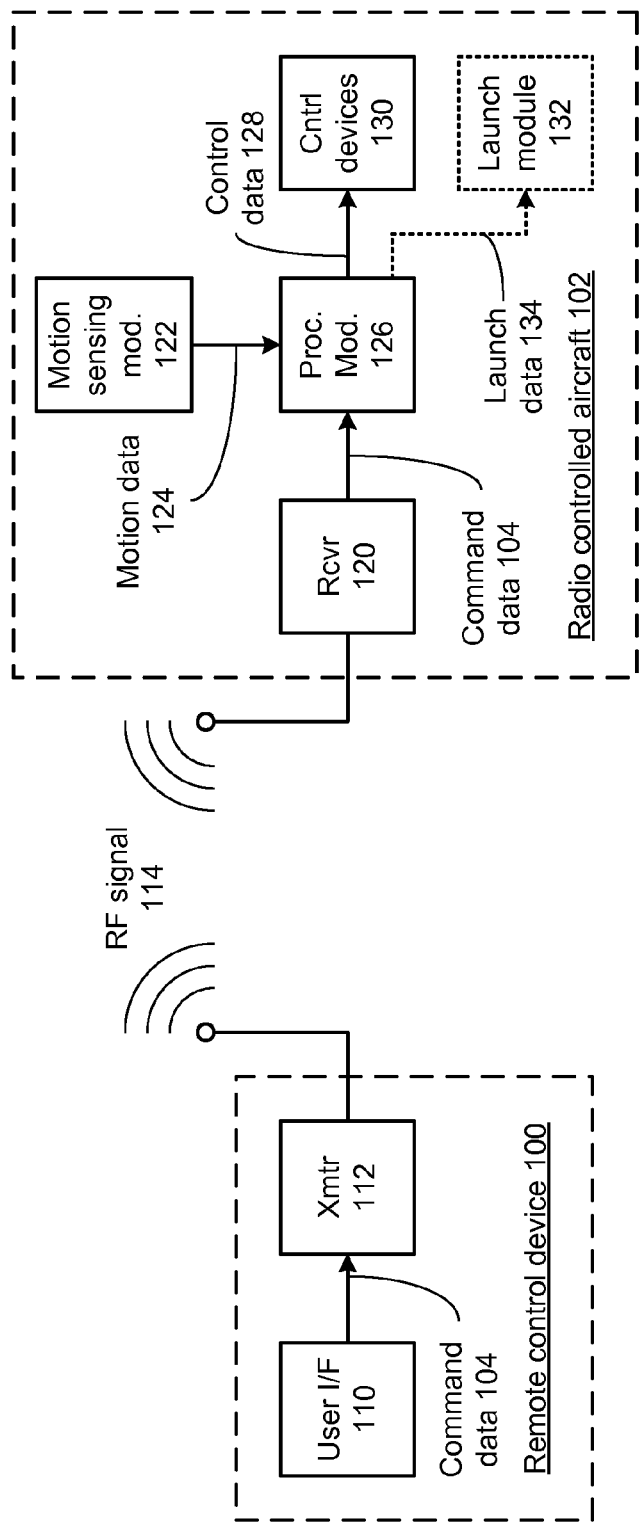
FIG. 6 is a schematic block diagram of a remote control device 100 and aircraft 102 in accordance with an embodiment of the present invention.

FIG. 6 is a schematic block diagram of a remote control device 100 and aircraft 102 in accordance with an embodiment of the present invention. In particular, remote control device 100 includes a user interface 110 such as one or more joy-sticks, click-wheels, buttons, dials, switches, levers or other user interface devices that respond to actions of the user and generate command data 104 in response thereto. Radio transmitter 112, generates and transmits an RF signal 114 that contains the command data 104.

RC aircraft 102 includes receiver 120 that is coupled to receive RF signal 114 from the remote control device 100 and to regenerate the command data 104 contained therein. In particular, command data 104 can include data that represents commands such as generated includes orientation commands $\psi_1$, $\psi_2$ accordance with a coordinate system from a perspective of the remote control device 100, other command data that may or not be not transformed such as V and L, and other command data corresponding to other function and features.

RC aircraft 102 further includes a motion sensing module 122 that generates motion data 124 based on the motion of the RC aircraft 102. In an embodiment of the present invention, motion sensing module 122 includes one or more axes of accelerometers or gyroscopes or other devices that alone, or with further processing by processing module 126, can generate data that represents $\theta$, $\varphi_3$, and/or other motion parameters such as R, Z, etc., that can be used in transforming the command data 104 to control data 128.

Processing module 126, transforms the command data 104 into control data 128 in accordance with a coordinate system from a perspective of the RC aircraft. For example, processing module 126 can generate $\varphi_1$, $\varphi_2$, v and l, based on the command data 104 such as $\psi_1$, $\varphi_2$, V and L, and motion data 124 such as $\theta$, $\varphi_3$. This control data 128 is provided to a plurality of control devices 130 such as actuators, control surfaces, gimbals or other controllers that control the motion of RC aircraft 102 as previously described. In particular, control devices 130 and/or processing module can further include a feedback controller, state controller or other control mechanism that controls aircraft to the particular values of $\varphi_1$, $\varphi_2$, v and l.

Processing module 126 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 126 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, processing device 126 includes a look-up table, or other routine or application or that generates the control data 128 based on command data 104 and motion data 124 in accordance with the equations presented in conjunction with FIG. 5 or via one or more other transformations.

In a particular embodiment of the present invention, the command data 104 includes a mode selection that, based on its value, selects whether or not the RC aircraft 102 transforms the command data when calculating the control data 128. For instance, the command data can include a binary indicator that has one value that represents a traditional mode of operation and another value that transforms command data 104 to generate control data 128. In this embodiment, the user can select to operate the RC aircraft 102 in one mode that transforms orientation commands from the remote control device 100 from the perspective of the remote control device 100 to the perspective of the RC aircraft 102. Further, the user can instead select to operate the RC aircraft 102 in a traditional fashion by generating command data 104 from the perspective of the aircraft itself with yaw-axis controls being proportional to yaw-axis commands and pitch-axis controls being proportional to pitch-axis commands. In this fashion, a user can select the mode he or she finds easiest to use. In addition, different users could select to operate the RC aircraft 102 in different modes.

RC aircraft 102 optionally includes a launch module 132 that responds to launch data 134 included in command data 104 to launch an object from the RC aircraft 102, such as a parachutist action figure, bomb missile or other toy or object. Launch module 132 can include a magnetic coupling, retractable hook or other releasable coupling that holds and selectively releases one or more object in respond to the launch command, either successively, one object at a time in response to repeated transmissions of the launch data from the remote control device 100 or based on individual launch data separately identified for each such object.

In one possible implementation of remote control device 100, user interface 110 includes a plurality of spring-loaded interface devices, where each of the plurality of spring-loaded interface devices has a return position that is returned to when no force is applied. In this implementation, the remote control device 100 commands the RC aircraft to hover or substantially a hover when no force is applied to each of the plurality of spring-loaded interface devices. For example, the pitch-axis, roll-axis and lift command interface devices can have a position, such as a center position they return to. The center position of the pitch-axis and roll-axis interface devices operate to generate command data 104 for the pitch-axis and roll-axis to correspond to horizontal flight or substantially horizontal flight within an acceptable level of tolerance. The center position of the lift command interface device operates to generate a lift command that corresponds to a lift force that equals or substantially equals the weight of the RC aircraft 102. Where the weight of the RC aircraft changes, such as when objects are selectively launched or dropped from the aircraft, the processing module 126 can determine a current weight for the RC aircraft 102 based on whether objects have been dropped, how many objects and/or which objects have been dropped, etc.

Figure 7:
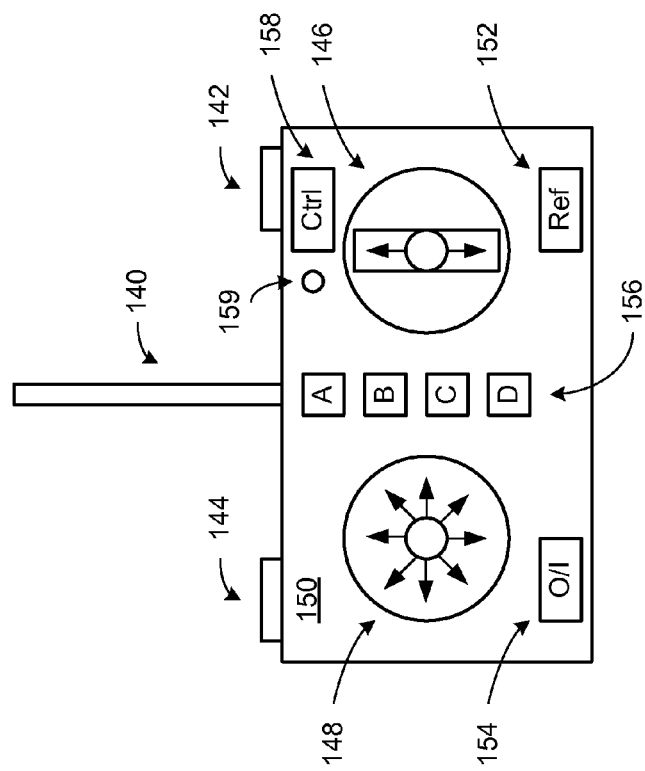
FIG. 7 is a pictorial representation of a remote control 150 in accordance with an embodiment of the present invention.

FIG. 7 is a pictorial representation of a remote control 150 in accordance with an embodiment of the present invention. In particular, remote control 150, such as remote control device 100, includes am antenna 140 for coupling to a receiver, such as receiver 120. Button 142, when pressed by a user, generates a clockwise yaw-velocity command. In a similar fashion, button 144, when pressed by a user, generates a counter-clockwise yaw-velocity command. Lift command device includes a spring-loaded lever that generates a lift command corresponding to a hover-state, when in the center position. The lift command can command an increased lift force when pushed up to raise the RC aircraft 102 and a decreased lift force when pushed down to lower the RC aircraft 102. Two-axis joystick 148 can be displaced in two-dimensions about a center position. Upward and downward displacements of the joystick 148 correspond to pitch axis commands and right and left displacements correspond to roll-axis commands. When the force is removed from the joystick 148, it returns to a center position that generates command data 104 corresponding to horizontal flight.

Remote control 150 further includes a reference button, for setting the reference position of the RC aircraft 102 to aid in the determination of motion data 124, as will be described in greater detail in conjunction with FIG. 8. An on-off button 154 is included. Mode control button 158 is used to select a mode of operation for the remote control. For instance, mode control button 158 can operate on a toggle basis to set or reset the mode to either a mode where joystick 148 and lever 146 operate to generate traditional command data 104 used to generate controls from the perspective of the RC aircraft, or another mode where command data 104 is transformed from the perspective of the remote control 150 to the perspective of the RC aircraft 102. Indicator light 159 can be included to indicate the particular mode selected, by a unique color or by being either on or off.

Additional buttons 156 are included for activating other functions and features of RC aircraft 102 such as the generation of launch data 130 for one or more objects or to implement other optional features.

FIG. 8 is a pictorial representation of a radio controlled aircraft 102 launching parachutists 166 and 168 in accordance with an embodiment of the present invention. In this embodiment, RC aircraft 102 includes a launch module 132 that responds to launch data 132 from a remote control device 102 to launch a first action FIG. 166, configured as a parachutist, at a first time along trajectory 164. RC aircraft 102 launches a second action FIG. 168, also configured as a parachutist, at a subsequent time along trajectory 162.

FIG. 9 is a pictorial/block diagram representation of the set-up of remote control device 100 and radio controlled aircraft 102 in accordance with an embodiment of the present invention. In particular, in this mode of operation, motion sensing module 124 generates motion data 126 based on the relative motion of the RC aircraft 102. The remote control device 100 and RC aircraft 102 establish an initial position of RC aircraft 102 that can be used by motion sensing module 124 that serves as an origin or other reference position. For instance, the user can be instructed to place the RC aircraft 102 on the ground, a predetermined distance, $R_{ref}$ from the remote control device 100 with the tail of the RC aircraft aligned in the direction of remote control device 100 along axis 170. Pressing the reference button, such as reference button 152, in this position establishes initial conditions: $R=R_{ref}$, $\theta=0$, $Z=0$, $\varphi_1=0$, $\varphi_2=0$, and $\varphi_3=0$. As the RC aircraft 102 is subsequently moved in operation, the relative motion of the RC aircraft, reflected by motion data 124, can be used to determine a position and orientation of the RC aircraft 102 from the origin established by the position of remote control 100 during setup.

FIG. 10 is a flowchart representation of a method in accordance with an embodiment of the present invention. In particular, a method is presented for use with one or more features or functions presented in conjunction with FIGS. 1-9. In step 400, an RF signal is received from a remote control device, the RF signal containing command data in accordance with a first coordinate system, wherein the first coordinate system is from a perspective of the remote control device. In step 402 motion data is generated based on the motion of the RC aircraft. In step 404, the command data is transformed into control data in accordance with a second coordinate system, wherein the second coordinate system is from a perspective of the RC aircraft. In step 406, the motion of the RC aircraft is controlled based on the control data.

In an embodiment of the present invention, the command data includes roll-axis command data and pitch-axis command data, the control data includes roll-axis control data, and the motion data includes yaw-axis motion data, and wherein step 404 includes generating the roll-axis control data as a function of the roll-axis command data, pitch-axis command data and the yaw-axis motion data. In addition, the command data can include roll-axis command data and pitch-axis command data, the control data can include pitch-axis control data, and the motion data includes yaw-axis motion data, and wherein step 404 includes generating the pitch-axis control data as a function of the roll-axis command data, pitch-axis command data and the yaw-axis motion data. The RF signal can include mode data, and wherein, when the mode data has a first value, step 404 is selectively bypassed and the control data generated in proportional to the command data.

The command data can include lift command data and the control data can include lift control data, wherein step 404 includes generating the lift control data based on a weight of the RC aircraft. The command data can include yaw-velocity command data and the control data can include yaw-velocity control data and wherein step 404 includes generating yaw-velocity control data as a proportion of the yaw-velocity command data.

FIG. 11 is a flowchart representation of a method in accordance with an embodiment of the present invention. In particular, a method is presented for use with one or more features or functions presented in conjunction with FIGS. 1-10 wherein command data includes launch data. In step 410, an object is launched from the RC aircraft in response to the launch data. In an embodiment of the present invention, the object includes a parachute, parachutist action figure, toy missile or bomb or other object.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to order of magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio controlled (RC) vehicle comprising:
   a receiver configured to receive a radio frequency (RF) signal from a remote control device, the RF signal indicating command data in accordance with a first coordinate system, wherein the command data indicates a lift command associated with a hovering state of the RC vehicle, wherein the command data includes roll-axis command data and pitch-axis command data, wherein the command data includes yaw-velocity command data, and wherein the first coordinate system is from a perspective of the remote control device;
   motion sensors configured to generate motion data, wherein the motion data indicates a position of the RC vehicle and an orientation of the RC vehicle, wherein the orientation of the RC vehicle is a yaw-axis orientation from the perspective of an imaginary pilot of the RC vehicle, wherein the motion sensors include a first motion sensor and a second motion sensor, wherein the first motion sensor includes an accelerometer, and wherein the second motion sensor includes a gyroscope;
   a processor coupled to the motion sensors and to the receiver, the processor configured to transform the command data into control data based on the motion data and in accordance with a second coordinate system, wherein the second coordinate system is from a perspective of the RC vehicle, wherein the control data includes roll-axis control data and pitch-axis control data, wherein the roll-axis control data is generated based on the roll-axis command data and the pitch-axis command data, wherein the pitch-axis control data is generated based on the roll-axis command data and the pitch-axis command data, wherein the control data includes yaw-velocity control data, and wherein the yaw-velocity control data is related to the yaw-velocity command data; and
   control devices coupled to the processor, the control devices configured to control motion of the RC vehicle based on the control data, wherein the control devices are configured to cause the RC vehicle to enter the hovering state in response to the receiver receiving the command data that indicates the lift command.

2. The RC vehicle of claim 1, wherein the motion data indicates the position of the RC vehicle relative to a position of the remote control device.

3. The RC vehicle of claim 2, wherein the position of the RC vehicle is generated to indicate an angle relative to the remote control device.

4. The RC vehicle of claim 3, wherein the first coordinate system from the perspective of the remote control device considers the remote control device to be reoriented by a user of the remote control device to face the RC vehicle responsive to changes in the position of the RC vehicle.

5. The RC vehicle of claim 4, wherein the command data is transformed based on a difference between the angle relative to the remote control device and the orientation of the RC vehicle.

6. The RC vehicle of claim 1, wherein the position of the RC vehicle is generated to include at least two coordinates.

7. The RC vehicle of claim 6, wherein the orientation of the RC vehicle is generated to include at least two coordinates.

8. The RC vehicle of claim 1, wherein the position of the RC vehicle is generated to include at least three coordinates.

9. The RC vehicle of claim 8, wherein the orientation of the RC vehicle is generated to include at least three coordinates.

10. A radio controlled (RC) vehicle comprising:
    a receiver configured to receive a radio frequency (RF) signal from a remote control device, the RF signal indicating command data in accordance with a first coordinate system, wherein the command data indicates a lift command associated with a hovering state of the RC vehicle, wherein the command data includes roll-axis command data and pitch-axis command data, wherein the command data includes yaw-velocity command data, wherein the first coordinate system is from a perspective of the remote control device that considers the remote control device to be oriented by a user of the remote control device to face the RC vehicle responsive to changes in a position of the RC vehicle;
    motion sensors configured to generate motion data, wherein the motion data indicates the position of the RC vehicle and an orientation of the RC vehicle, wherein the motion data indicates the position of the RC vehicle relative to a position of the remote control device, wherein the position of the RC vehicle is generated to indicate an angle relative to the remote control device, wherein the motion sensors include a first motion sensor and a second motion sensor, wherein the first motion sensor includes an accelerometer, and wherein the second motion sensor includes a gyroscope;
    a processor coupled to the motion sensors and to the receiver, the processor configured to transform the command data into control data based on the motion data and in accordance with a second coordinate system, wherein the second coordinate system is from a perspective of the RC vehicle, wherein the control data includes roll-axis control data and pitch-axis control data, wherein the roll-axis control data is generated based on the roll-axis command data and the pitch-axis command data, wherein the pitch-axis control data is generated based on the roll-axis command data and the pitch-axis command data, wherein the control data includes yaw-velocity control data, and wherein the yaw-velocity control data is related to the yaw-velocity command data; and control devices coupled to the processor, the control devices configured to control motion of the RC vehicle based on the control data, wherein the control devices are configured to cause the RC vehicle to enter the hovering state in response to the receiver receiving the command data that indicates the lift command;

wherein the command data is transformed based on a difference between the angle relative to the remote control device and the orientation of the RC vehicle.

11. The RC vehicle of claim 10, wherein the orientation of the RC vehicle is a yaw-axis orientation from the perspective of an imaginary pilot of the RC vehicle.

12. The RC vehicle of claim 10, wherein the position of the RC vehicle is generated to include at least two coordinates.

13. The RC vehicle of claim 12, wherein the orientation of the RC vehicle is generated to include at least two coordinates.

14. The RC vehicle of claim 10, wherein the position of the RC vehicle is generated to include at least three coordinates.

15. The RC vehicle of claim 14, wherein the orientation of the RC vehicle is generated to include at least three coordinates.

16. A radio controlled (RC) vehicle comprising:
a receiver configured to receive a radio frequency (RF) signal from a remote control device, the RF signal indicating command data in accordance with a first coordinate system, wherein the command data indicates a lift command associated with a hovering state of the RC vehicle, wherein the command data includes roll-axis command data and pitch-axis command data, wherein the command data includes yaw-velocity command data, wherein the first coordinate system is from a perspective of the remote control device that considers the remote control device to be oriented by a user of the remote control device to face the RC vehicle responsive to changes in a position of the RC vehicle;

motion sensors configured to generate motion data, wherein the motion data indicates the position of the RC vehicle and an orientation of the RC vehicle, wherein the orientation of the RC vehicle is a yaw-axis orientation from the perspective of an imaginary pilot of the RC vehicle, wherein the position of the RC vehicle is generated to include at least three coordinates, wherein the motion sensors include a first motion sensor and a second motion sensor, wherein the first motion sensor includes an accelerometer, and wherein the second motion sensor includes a gyroscope;

a processor coupled to the motion sensors and to the receiver, the processor configured to transform the command data into control data based on the motion data and in accordance with a second coordinate system, wherein the second coordinate system is from a perspective of the RC vehicle, wherein the control data includes roll-axis control data and pitch-axis control data, wherein the roll-axis control data is generated based on the roll-axis command data and the pitch-axis command data, wherein the pitch-axis control data is generated based on the roll-axis command data and the pitch-axis command data, wherein the control data includes yaw-velocity control data, and wherein the yaw-velocity control data is related to the yaw-velocity command data; and control devices coupled to the processor, the control devices configured to control motion of the RC vehicle based on the control data, wherein the control devices are configured to cause the RC vehicle to enter the hovering state in response to the receiver receiving the command data that indicates the lift command.

* * * * *